United States Patent
Sadasue et al.

(10) Patent No.: US 8,507,146 B2
(45) Date of Patent: Aug. 13, 2013

(54) DIAPHRAGM FOR SOLID POLYMER FUEL CELL AND MEMBRANE-ELECTRODE ASSEMBLY

(75) Inventors: Kazuyuki Sadasue, Yamaguchi (JP); Kenji Fukuta, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 564 days.

(21) Appl. No.: 12/447,378

(22) PCT Filed: Oct. 25, 2007

(86) PCT No.: PCT/JP2007/070777
§ 371 (c)(1),
(2), (4) Date: Apr. 27, 2009

(87) PCT Pub. No.: WO2008/053770
PCT Pub. Date: May 8, 2008

(65) Prior Publication Data
US 2009/0263699 A1    Oct. 22, 2009

(30) Foreign Application Priority Data
Oct. 27, 2006    (JP) .................................. 2006-292980

(51) Int. Cl.
*H01M 8/10*    (2006.01)
*H01M 2/08*    (2006.01)
*H01M 2/14*    (2006.01)

(52) U.S. Cl.
USPC ............................. 429/492; 429/483; 429/509

(58) Field of Classification Search
USPC ....................................... 429/79, 83, 400–535
See application file for complete search history.

(56) References Cited

U.S. PATENT DOCUMENTS

| | | | | |
|---|---|---|---|---|
| 2003/0008137 A1* | 1/2003 | Bohm et al. | .................. | 428/343 |
| 2005/0042489 A1* | 2/2005 | Fukuta et al. | .................. | 429/30 |
| 2007/0020501 A1* | 1/2007 | Li et al. | .......................... | 429/33 |

FOREIGN PATENT DOCUMENTS

| | | |
|---|---|---|
| EP | 1496561 A2 | 1/2005 |
| JP | 9-161534 A | 6/1997 |
| JP | 2002-252037 A | 9/2002 |
| JP | 2003-288916 A | 10/2003 |
| JP | 2003282088 A | 10/2003 |
| JP | 2005-113051 A | 4/2005 |
| JP | 2005-320472 A | 11/2005 |

OTHER PUBLICATIONS

English Language Abstract for JP 9-161538.
English Language Abstract for JP 2002-252037.
English Language Abstract for JP 2005-320472.
English Language Abstract for JP 2005-113051.
English Language Abstract for JP 2003-288916.

* cited by examiner

*Primary Examiner* — Patrick Ryan
*Assistant Examiner* — Muhammad Siddiquee
(74) *Attorney, Agent, or Firm* — Norris McLaughlin & Marcus PA

(57) ABSTRACT

The present invention discloses a membrane for polymer electrolyte fuel cell, which comprises
  a hydrocarbon cation exchange resin membrane wherein a cation exchange group is covalently bonded to a hydrocarbon resin, and
  an adhesive layer formed on at least one side of the hydrocarbon cation exchange resin membrane,
wherein the adhesive layer is made of a hydrocarbon cation exchange resin having a Young's modulus of 1 to 300 MPa and a solubility of less than 1% by mass in water of 20° C.; and a membrane-electrode assembly which is obtained by forming a catalyst electrode layer on at least one side of the above-mentioned membrane for polymer electrolyte fuel cell.

8 Claims, 2 Drawing Sheets

DIAPHRAGM FOR SOLID POLYMER FUEL CELL AND MEMBRANE-ELECTRODE ASSEMBLY

This application is a 371 application of PCT/JP2007/070777 filed Oct. 25, 2007, which claims priority to the Japanese application 2006-292980 Oct. 27, 2006.

TECHNICAL FIELD

The present invention relates to a membrane for polymer electrolyte fuel cell and a membrane-electrode assembly produced using the membrane. The membrane comprises a cation exchange resin membrane and an adhesive layer made of a proton-conductive, soft elastomer, formed on at least one side of the cation exchange resin membrane. Or, the membrane comprises a cation exchange resin membrane and an adhesive layer formed on at least one side of the cation exchange resin membrane via an intermediate layer. The membrane adheres well to a catalyst electrode layer via the adhesive layer and reduces the interfacial resistance between the membrane and the catalyst electrode layer; therefore, the fuel cell produced with the membrane has a high output.

BACKGROUND ART

Ion exchange resin membrane is in wide use as a membrane for cell (e.g. polymer electrolyte fuel cell, redox flow cell or zinc-bromine cell), a membrane for dialysis, etc. Polymer electrolyte fuel cell uses an ion exchange resin membrane as the polymer electrolyte membrane. When a fuel and an oxidant are fed continuously into this polymer electrolyte fuel cell, they react with each other, generating a chemical energy. The chemical energy generated is taken out as an electric power, and the fuel cell is power generation system which is clean and highly efficient. In recent years, the polymer electrolyte fuel cell has increased its importance for uses in automobile, household and portable devices because it can be operated at low temperatures and can be produced in a small size.

The polymer electrolyte fuel cell has, in general, a structure in which a diffusion electrode having a catalyst loaded thereon is bonded to each side of an ion exchange resin membrane functioning as an electrolyte. In general, the diffusion electrode is an electrode obtained by bonding, to a porous electrode material, a catalyst electrode layer constituted by a catalyst and carbon particles having the catalyst loaded thereon. When an electric power is taken out from the polymer electrolyte fuel cell, hydrogen gas or a liquid fuel (e.g. methanol) is fed into a chamber (a fuel chamber) in which one of the two diffusion electrodes is present, and an oxygen-containing gas (e.g. oxygen or air) as an oxidant is fed into a chamber (an oxidant chamber) in which the other diffusion electrode is present. When, in this state, an external load circuit is connected to the two diffusion electrodes, the fuel cell works as such and an electric power is supplied to the external circuit.

Of polymer electrolyte fuel cells, direct liquid fuel cell utilizing methanol or the like per se as the fuel, is evaluated highly because it uses a liquid fuel easy to handle and the fuel is inexpensive. For these reasons, the direct liquid fuel cell is expected as a power source of relatively small output, used for portable devices.

The fundamental structure of polymer electrolyte fuel cell is shown in FIG. 1. In FIGS. 1, 1a and 1b are each a partition wall of cell. The cell partition walls 1a and 1b are formed at the both sides of a solid polymer electrolyte membrane 6 made of an ion exchange resin membrane, so as to sandwich the solid polymer electrolyte membrane 6. The solid polymer electrolyte membrane 6 functions as a membrane.

2 is a fuel passage formed in the inner wall of one cell partition wall 1a. 3 is an oxidant gas passage formed in the inner wall of other cell partition wall 1b. 4 is a diffusion electrode of fuel chamber side. 5 is a gas diffusion electrode of oxidant chamber side.

In this polymer electrolyte fuel cell, when a fuel such as alcohol, hydrogen gas or the like is fed into a fuel chamber 7, protons (hydrogen ions) and electrons are generated by the action of the catalyst provided in the fuel chamber side diffusion electrode 4. The protons pass through the inside of the solid polymer electrolyte membrane 6 and reach an oxidant chamber 8, where the protons react with the oxygen in air or in oxygen gas, generating water. Meanwhile, the electrons generated at the fuel chamber side diffusion electrode 4 pass through an external load circuit (not shown) and are sent to the oxidant chamber side gas diffusion electrode 5. At this time, an electric energy is supplied to the external circuit.

In the polymer electrolyte fuel cell having the above-mentioned structure, there is ordinarily used a cation exchange resin membrane as the solid polymer electrolyte membrane 6. On the surface of the cation exchange resin membrane are formed diffusion electrodes 4 and 5. Ordinarily, hot pressing is used for formation of the diffusion electrodes 4 and 5 on the surface of the cation exchange resin membrane. In this hot pressing, first there is formed, on a substrate, a diffusion electrode constituted by a porous electrode material and a catalyst electrode layer formed on one side thereof. Then, the diffusion electrode having the catalyst electrode layer thereon is heat-transferred from the substrate onto the surface of a cation exchange resin membrane. The cation exchange resin membrane and the catalyst electrode layer are made into one piece by the thermal compatibilization of the polymer electrolyte binders impregnated into the cation exchange resin membrane and the catalyst electrode layers.

As the cation exchange resin membrane used as the membrane for fuel cell, there has been mainly used a perfluorocarbonsulfonic acid membrane. This membrane is superior in chemical stability. However, since the membrane is insufficient in physical strength, it is difficult to make thin the membrane for lower electrical resistance. When methanol is used as a fuel of fuel cell, the perfluorocarbonsulfonic acid membrane swells strikingly and is deformed. Further, there is a problem that the diffusion of methanol (fuel) into oxidant chamber side cannot be suppressed sufficiently. Furthermore, the perfluorocarbonsulfonic acid is expensive.

For the cation exchange resin membrane, in order to suppress fuel permeation and impart mechanical strength, it has been hitherto conducted, for example, to add a reinforcing agent thereto or allow the membrane per se to have a crosslinked structure. As a result, the cation exchange resin membrane has high hardness, in many cases. For the same purpose as mentioned above, the cation exchange resin membrane is constituted in some cases by a resin material of relatively high hardness, such as engineering resin. Because of these reasons, the adhesivity between the catalyst electrode layer and the cation exchange resin membrane of high hardness is inferior and low adhesion tends to appear in the interface between them. As a result, the electrical resistance at the interface between them is high. Further, when a liquid fuel is used as a fuel for fuel cell, the interface between them is exposed to the liquid fuel. As a result, the adhesivity at the interface tends to be low.

Also, since they differ in chemical strength, composition, etc., they differ in the extent of swelling in liquid fuel, which may lead to peeling of catalyst electrode layer.

In Patent Literature 1 is disclosed a technique of forming a buffer layer between a cation exchange resin membrane (made of, for example, a sulfonated polyarylene obtained by sulfonating an engineering resin) and a catalyst electrode layer, to improve the adhesivity between them. In the buffer layer, there is used a sulfonated engineering resin whose dynamic viscoelastic modulus is smaller than that of the cation exchange resin membrane. However, since the engineering resin is low in flexibility, no intended adhesivity is obtained. Further, since the cation exchange resin membrane and the buffer layer have, at their bonded interface, no continuous structure viewed from their materials, peeling appears between them when the bonded portion comes in contact with a liquid fuel.

In Patent Literature 2 is disclosed a technique of using a polymer electrolyte membrane (Nafion 112 produced by Du Pont) as a cation exchange resin membrane and attaching thereto, by thermocompression bonding, a catalyst electrode layer obtained by mixing thereinto a polyethylene fine powder as a softening temperature-reducing agent, in order to prevent the formation of pinholes in the cation exchange resin membrane. In this membrane, the insulating polyethylene fine powder is present between the cation exchange resin membrane and the catalyst electrode layer. As a result, the interfacial resistance between the two is high. Further, since the polyethylene is not sufficiently flexible, it is impossible to completely suppress the peeling between the cation exchange resin membrane and the catalyst electrode layer.

In Patent Literature 3 is disclosed a fuel cell obtained by providing, between a cation exchange resin membrane and a catalyst electrode layer, an intermediate layer made of a perfluorocarbonsulfonic acid whose viscosity has been adjusted by adding a solvent. In this case, the intermediate layer becomes porous upon vaporization of the solvent. As a result, the proton conductive paths between the cation exchange resin membrane and the catalyst electrode layer disappear, the interfacial resistance increases and the adhesivity decreases; and peeling appears between the two.

In the Patent Literatures 1 to 3, it is described to adhere a cation exchange resin membrane and a catalyst electrode layer using an adhesive made of a plastic resin; however, there is disclosed no technique of forming, between a cation exchange resin membrane and a catalyst electrode layer, an adhesive layer made of an elastomer having high flexibility, high elastic modulus and high proton conductivity.

Patent Literature 1: JP-A-2002-298867
Patent Literature 2: JP-A-2003-282088
Patent Literature 3: JP-A-2000-195527

DISCLOSURE OF THE INVENTION

Task to be Achieved by the Invention

The present inventors made a study in order to solve a problem that peeling appears between a cation exchange resin membrane and a catalyst electrode layer and this reduces the proton conductivity between the two. The study found out that as a cation exchange resin membrane had a higher crosslinking degree and a higher hardness, the permeation of fuel, particularly liquid fuel through the membrane could be suppressed more effectively. However, as the cation exchange resin membrane had a higher hardness, the peeling between cation exchange resin membrane and catalyst electrode layer became more striking. The present invention intends to solve the above problem. That is, the present invention aims at providing a membrane for polymer electrolyte fuel cell, which suppresses the peeling between cation exchange resin membrane and catalyst electrode layer, operates stably over a long period of time, and shows high proton conductivity between them; and a membrane-electrode assembly produced using the above membrane.

Means for Achieving the Task

The present inventors thought of placing, between a cation exchange resin membrane and a catalyst electrode layer, an adhesive layer made of a styrene-based elastomer which has a far higher flexibility as compared with thermoplastic resins, has elasticity, and has an ion-exchange group. With this approach, even when there is used a highly crosslinked membrane of high non-permeability to liquid fuel or a cation exchange resin membrane of high hardness, there is obtained reliable adhesion between such a cation exchange resin membrane and a catalyst electrode layer, and problems such as peeling between them can be solved. It was further found that the placement of an adhesive layer made of the above-mentioned elastomer, between them enhanced greatly the proton conductivity at the interface between them. The reason for this great enhancement of proton conductivity is now under investigation.

The present inventors presume that the electroconductive material (e.g. electroconductive carbon) having a catalyst loaded thereon is sufficiently wrapped in the soft elastomer at the interface and, as a result, a sufficient contact area is secured between the electroconductive material, the electrode material and the elastomer, resulting in enhanced proton conductivity.

It was furthermore found that the placement between the cation exchange resin membrane and the adhesive layer, of an intermediate layer having a polarity opposite to their polarity gives rise to ionic bonding at their interface, which further enhances the adhesion strength between the cation exchange resin membrane and the catalyst electrode layer. The present invention has been completed based on the above findings.

The present invention is as described below.

[1] A membrane for polymer electrolyte fuel cell, which comprises a hydrocarbon cation exchange resin membrane wherein a cation exchange group is covalently bonded to a hydrocarbon resin, and an adhesive layer formed on at least one side of the hydrocarbon cation exchange resin membrane, wherein the adhesive layer is having a Young's modulus of 1 to 300 MPa and having a solubility of less than 1% by mass in water of 20° C.

[2] The membrane for polymer electrolyte fuel cell according to [1], wherein the adhesive layer has a solubility of less than 1% by mass in methanol of 20° C.

[3] The membrane for polymer electrolyte fuel cell according to [1], wherein the adhesive layer is made of soft cation exchange resin wherein a cation exchange group is covalently bonded to a styrene-based elastomer.

[4] The membrane for polymer electrolyte fuel cell according to [3], wherein the styrene-based elastomer is a polystyrene-polyalkylene-polystyrene triblock copolymer.

[5] The membrane for polymer electrolyte fuel cell according to [1], wherein an intermediate layer made of a hydrocarbon anion exchange resin is present between the hydrocarbon cation exchange resin membrane and the adhesive layer.

[6] A membrane-electrode assembly which is obtained by forming a catalyst electrode layer on at least one side of the membrane for polymer electrolyte fuel cell according to [1] or [5].

[7] The membrane-electrode assembly according to [6], wherein the catalyst electrode layer is formed on both sides of the membrane for polymer electrolyte fuel cell.

Effects of the Invention

The membrane of the present invention is a membrane for polymer electrolyte fuel cell having high non-permeability to fuel, particularly liquid fuel and high proton conductivity.

The polymer electrolyte fuel cell having the membrane of the present invention is high in fuel non-permeability as well as in proton conductivity and accordingly yields a high cell output.

EXPLANATION OF NUMERICAL SYMBOLS 1a and 1b are each a cell partition wall; 2 is a fuel passage; 3 is an oxidant gas passage; 4 is a diffusion electrode at fuel chamber side; 5 is a gas diffusion electrode at oxidant chamber side; 6 is a solid polymer electrolyte membrane (a cation exchange membrane); 7 is a fuel chamber; 8 is an oxidant chamber; 200, 300, 400 and 500 are each a membrane for polymer electrolyte fuel cell; 202 and 502 are each a hydrocarbon cation exchange resin membrane; 204, 206, 304, 404, 406 and 504 are each an adhesive layer; 302, 402 and 502 are each a hydrocarbon cation exchange resin membrane; and 408, 410 and 508 are each an intermediate layer.

BEST MODE FOR CARRYING OUT THE INVENTION

First Embodiment of Membrane

Figure 2:
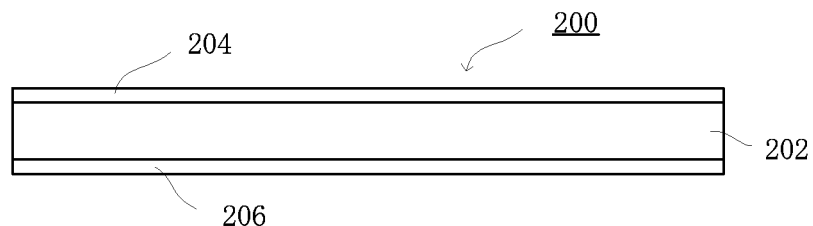
FIG. 2 is a conceptual drawing of a constitution of the first embodiment of the hydrocarbon cation exchange resin membrane of the present invention.

In FIG. 2 is shown a constitution of the first embodiment of the membrane for polymer electrolyte fuel cell (hereinafter referred to simply as cell membrane, in some cases), of the present invention. In FIG. 2, 200 is a membrane for polymer electrolyte fuel cell, and it comprises a hydrocarbon cation exchange resin membrane 202 and adhesive layers 204 and 206 formed on the both sides of the membrane 202.

Figure 3:
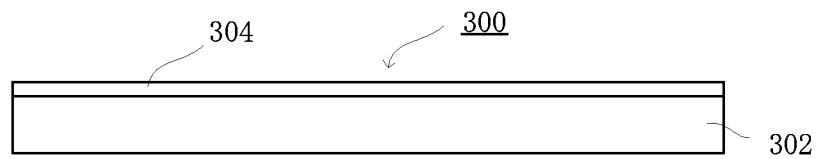
FIG. 3 is a conceptual drawing of other constitution of the first embodiment of the hydrocarbon cation exchange resin membrane of the present invention.

FIG. 3 shows other constitution of the membrane for polymer electrolyte fuel cell, of the present invention. In FIG. 3, 300 is a cell membrane, and it comprises a hydrocarbon cation exchange resin membrane 302 and an adhesive layer 304 formed on one side of the membrane 302.

The hydrocarbon cation exchange resin membrane is a membrane which is a hydrocarbon resin having a cation exchange group covalently bonded thereto, and there can be used any known hydrocarbon cation exchange resin membrane with no restriction. The cation exchange resin constituting the hydrocarbon cation exchange resin membrane is composed of a hydrocarbon polymer having a cation exchange group. This cation exchange resin is generally hard as compared with fluorine-based ion exchange resins. As the cation exchange resin, there can be mentioned, for example, cation exchange resins obtained by as necessary introducing functional groups into a polystyrene material or an engineering plastic material typified by, for example, a polysulfone, a polyetherketone, a polyetheretherketone, or polybenzimidazole.

As the cation exchange resin used particularly in a fuel cell, there is preferred one obtained by allowing a polymer to have a crosslinked structure, so as to have no solubility in liquid fuel or water or have suppressed permeability to fuel. Therefore, the cation exchange resin membrane is hard.

As the method for suppressing fuel permeability, there are generally a method of forming a crosslinked structure by covalent bonding and a method of forming, in an ion exchange resin membrane, a crosslinked structure based on an ionic complex between cationic functional group and anionic functional group. The cation exchange resin having an ionic complex therein, similarly to the cation exchange resin having a crosslinked structure by covalent bonding, is hard. A cation exchange resin obtained by forming an ionic complex in the cation exchange resin having a crosslinked structure by covalent bonding, is even harder.

In the general method for producing the above-mentioned crosslinked cation exchange resin, there is used, as a raw material, a hydrocarbon high-molecular copolymer such as styrene-divinylbenzene copolymer, styrene-butadiene copolymer, styrene-divinylbenzene-vinyl chloride, or the like; and the raw material is subjected to a treatment such as sulfonation, chlorosulfonation, conversion to phosphonium, hydrolysis or the like to obtain a cation exchange resin in which an intended cation exchange group is introduced into a hydrocarbon high-molecular copolymer via covalent bonding.

As the hydrocarbon cation exchange resin, there is preferred one in which all the portion other than the cation exchange group is constituted by hydrocarbon; however, there is also included, besides the above, one in which the most portion of main chain and side chain is formed by carbon and hydrogen. The hydrocarbon high-molecular copolymer may be one in which there is present, between the carbon-carbon linkages constituting the main chain and the side chain, a bond such as ether bond, ester bond, amide bond, siloxane bond or the like and in which there is contained a small amount of other atom deriving from the bond, such as oxygen, nitrogen, silicon, sulfur, boron, phosphorus or the like. The amount of the other atom is 40 mol % or less, preferably 10 mol % or less.

The group other than the cation exchange group, which may be bonded to the main chain and the side chain, may be, besides hydrogen, a small amount of atom (e.g. chlorine, bromine, fluorine or iodine) or other substituent. The amount of such an atom or substituent is preferably 40 mol % or less of the hydrogen, more preferably 10 mol % or less.

The hydrocarbon cation exchange resin membrane includes an ion exchange resin membrane which is constituted by a cation exchange resin alone by employing a method such as casting or the like. As the ion exchange resin membrane, there is preferably used an ion exchange resin membrane using a substrate (referred to also as reinforcing agent), for higher mechanical strength or higher dimensional stability, or for flexibility.

As the substrate, there can be used any substrate known for use in ion exchange resin membrane. A porous membrane, a nonwoven paper, a fabric, a nonwoven fabric, a paper, an inorganic membrane, etc. can be used with no restriction. As the material for the substrate, there is preferred a thermoplastic resin composition, a thermosetting resin composition, an inorganic material, or a mixture thereof. Of these substrate materials, a thermoplastic resin composition is more preferred because it is easy to produce and has a high adhesion strength to hydrocarbon cation exchange resin. As the thermoplastic resin composition, there can be mentioned, for example, a polyolefin resin obtained by homopolymerization of copolymerization of α-olefins such as ethylene, propylene, 1-butene, 1-pentene, 1-hexene, 3-methyl-1-butene, 4-methyl-1-pentene, 5-methyl-1-heptene and the like; vinyl chloride-based resins such as polyvinyl chloride, vinyl chloride-vinyl acetate copolymer, vinyl chloride-vinylidene chloride copolymer, vinyl chloride-olefin copolymer or the like; fluorine resins such as polytetrafluoroethylene, polychlorotrifluoroethylene, polyvinylidene fluoride, tetrafluoroethylene-hexafluoropropylene copolymer, tetrafluoroethylene-perfluoroalkyl vinyl ether copolymer, tetrafluoroethylene-ethylene copolymer or the like; polyamide resins such as nylon 6, nylon 66 or the like; and polyimide resins.

Of these resins, polyolefin resins is used preferably because they are superior in mechanical strength, chemical stability and chemical resistance and have good compatibility particularly with hydrocarbon ion exchange resins. As the polyolefin resins, a polyethylene resin or a polypropylene resin is particularly preferred and a polyethylene resin is most preferred.

Further, a porous membrane made of a polyolefin resin is preferred because it has a smooth surface, has good adhesivity to catalyst electrode layer and is superior in strength, and a porous membrane made of a polyethylene resin is more preferred.

In such a porous membrane used as the substrate for ion exchange resin membrane, its average pore diameter is preferably 0.005 to 5.0 µm, more preferably 0.01 to 2.0 µm. The porosity is preferably 20 to 95%, more preferably 30 to 90%. The air permeability (JIS P 8117) is preferably 1,500 seconds or less, more preferably 1,000 seconds or less.

The thickness of the porous membrane is preferably 5 to 150 µm, more preferably 10 to 120 µm, particularly preferably 15 to 50 µm in order to enable production of a cation exchange resin membrane which is thin and has a sufficient strength.

Such a porous membrane can be obtained by a method described in JP-A-1997-216964, JP-A-1997-235399, JP-A-2002-338721 or the like. Or, it can be obtained as a commercial product such as "Hipore" produced by Asahi Chemical Industry Co., Ltd., "U-pore" produced by Ube Industries, Ltd., "Setera" produced by Tonen Tapils Co., Ltd., "Excelpor" produced by Nitto Denko Corporation, or the like.

The hydrocarbon cation exchange resin membrane used in the present invention may contain other components such as plasticizer, inorganic filler and the like as long as the effects of the present invention are not impaired thereby.

The hydrocarbon cation exchange resin membrane used in the present invention may be produced by any method. In general, however, it is generally produced preferably by the following method.

That is, a monomers composition containing a polymerizable monomer which has a cation exchange group or into which a cation exchange group can be introduced, and an at least bifunctional crosslinkable monomer, is infiltrated into the pores of the above-mentioned substrate; then, the monomers composition is polymerized; thereafter, as necessary, an ion exchange group is introduced into the polymer obtained, to produce a hydrocarbon cation exchange resin membrane.

In the above monomers composition, as specific examples of the polymerizable monomer which has a cation exchange group or into which a cation exchange group can be introduced, there can be mentioned monofunctional polymerizable monomers such as monofunctional aromatic vinyl compounds (e.g. styrene, α-methylstyrene, vinyltoluene, 2,4-dimethylstyrene, p-tert-butylstyrene, α-halogenated styrene, chloromethylstyrene, vinylnaphthalene, vinylpyridine, vinylimidazole or styrenesulfonic acid), monofunctional (meth)acrylic acid or derivative thereof [e.g. (meth)acrylic acid, methyl (meth)acrylate or (meth)acrylamide-2-methylpropanesulfonic acid], other vinyl compound (e.g. vinylsulfonic acid, vinylphosphonic acid or maleic anhydride), and the like. Of these, preferred are monofunctional aromatic vinyl compounds such as styrene, α-methylstyrene, vinyltoluene, 2,4-dimethylstyrene, p-tert-butylstyrene, α-halogenated styrene, vinylnaphthalene and the like because a sulfonic group (which is a highly acidic group) can be easily introduced thereinto, and most preferred is, in particular, styrene because, with styrene, the cation exchange group density in cation exchange resin membrane can be made higher.

Meanwhile, as the at least bifunctional crosslinkable monomer, a bifunctional or trifunctional monomer can be used generally. Specifically, there can be mentioned polyfunctional aromatic vinyl compounds such as divinylbenzene, divinybiphenyl, trivinylbenzene and the like; polyfunctional (meth)acrylic acid derivatives such as trimethylolmethane trimethacrylate, methylenebisacrylamide, hexamethylenedimethacrylamide and the like; other polyfunctional polymerizable monomers such as butadiene, chloroprene, divinylsulfone and the like; and so forth. Of these, preferred are polyfunctional aromatic vinyl compounds such as divinylbenzene, divinylbiphenyl, trivinylbenzene and the like.

In the monomers composition, a polymerization initiator is preferably contained in order to polymerize the polymerizable monomer. As the polymerization initiator, any polymerization initiator can be used with no particular restriction as long as it can polymerize the polymerizable monomer. Specifically, there can be mentioned organic peroxides such as octanol peroxide, lauroyl peroxide, tert-butyl peroxy-2-ethylhexanoate, benzoyl peroxide, tert-butyl peroxyisobutyrate, tert-butyl peroxylaurate, tert-hexyl peroxybenzoate, di-tert-butyl peroxide and the like. The addition amount of the polymerization initiator may be a known amount used in polymerization of polymerizable monomer. In general, the amount is about 0.01 to 10 parts by mass per 100 parts by mass of the polymerizable monomer.

The monomers composition may contain a solvent as necessary, and may further contain known additives such as plasticizer, organic or inorganic filler and the like. Addition of, in particular, non-electroconductive particles (e.g. lamellar silicate) whose lengthwise diameter average of primary particles is at least 0.1 time the average pore diameter of substrate and is 50 µm or less (these particles are described in Japanese Patent Application No. 2003-377454, etc,) is preferred for enhancement of methanol non-permeability.

In producing the solid polymer electrolyte membrane used in the present invention, first, the above-mentioned monomers composition is contacted with a substrate. As the method for the contact, there can be mentioned, for example, a method of coating or spraying the monomers composition on the substrate, or immersing the substrate in the monomers composition. The contact method by immersion is preferred particularly because it is easy to produce the membrane. The time of immersion differs depending upon the kind of substrate or the formulation of monomers composition but, in general, it is 0.1 second to ten-odd minutes.

In polymerizing the monomers composition, a known polymerization method can be used with no restriction. There is generally preferred a method of adding a polymerization initiator composed of the above-mentioned peroxide, to the monomers composition and heating the mixture to give rise to polymerization. This method is easy to operate and enables relatively uniform polymerization. In the polymerization, it is more preferred to cover a substrate into which the monomers composition has been infiltrated, with a film (e.g. a polyester film) and then conduct polymerization. By thus covering the substrate, the hindrance for polymerization by oxygen is prevented and a filmy material having a smooth surface can be obtained. By covering the substrate with a film, it is further possible to remove the excessive portion of the monomers composition and obtain a thin uniform filmy material.

In using the above thermal polymerization method, there is no particular restriction as to the polymerization temperature and a known temperature condition can be selected appropriately. The temperature is generally about 50 to 150° C., preferably about 60 to 120° C. When the monomers composition contains a solvent, the solvent may be removed prior to the polymerization.

When there is used, as the polymerizable monomer, a polymerizable monomer having a cation exchange group, the filmy material obtained by polymerization can be used per se as the hydrocarbon cation exchange resin membrane used in the present invention.

Meanwhile, when there is used a polymerizable monomer into which a cation exchange group can be introduced, a filmy material is obtained and then an ion exchange group is introduced into the hydrocarbon polymer dispersed in the filmy material. There is no particular restriction as to the method for introduction of the cation exchange group, and a known method can be used appropriately. For example, when styrene is mainly used as the polymerizable monomer, the filmy material obtained is contacted with sulfur trioxide, chlorosulfonic acid, fuming sulfuric acid or concentrated sulfuric acid and then hydrolysis is conducted as necessary, whereby a sulfonic group can be introduced into the hydrocarbon polymer. When there is used a methacrylic acid ester as the polymerizable monomer, the ester moiety is hydrolyzed, whereby a carboxyl group can be introduced.

When there is used, as the polymerizable monomer, a polymerizable monomer having a cation exchange group, a filmy material is obtained and then, as necessary, a cation exchange group is introduced into the filmy material, whereby the density of cation exchange resin can be increased.

The hydrocarbon cation exchange resin membrane obtained by the above method has ordinarily a membrane resistance of 0.005 to 0.6 $\Omega cm^2$, preferably 0.01 to 0.5 $\Omega cm^2$ in a 3 mol/L aqueous sulfuric acid solution although the membrane resistance differs depending upon the kinds of monomers composition, cation exchange group and substrate used. It is practically impossible to obtain a membrane resistance of less than 0.005 $\Omega cm^2$. A membrane resistance of more than 0.6 $\Omega cm^2$ is too large, making it impossible to produce a fuel cell membrane of large output.

In order to control the membrane resistance of membrane in the above range, it is preferred to control the cation exchange capacity of membrane in a range of 0.2 to 5 mmol/g, preferably 0.5 to 3 mmol/g.

The water content of the hydrocarbon cation exchange resin membrane is preferably 7% by mass or more, more preferably 10% by mass or more in order to prevent the drying of the membrane and subsequent reduction in the proton conductivity of the membrane. The water content is generally kept at about 7 to 90% by mass. In order to keep the water content in the above range, the kind of ion exchange group, the ion exchange capacity and the crosslinking degree are controlled.

In general, the thickness of the hydrocarbon cation exchange resin membrane is preferably 5 to 150 μm, more preferably 10 to 90 μm so that the membrane has a low membrane resistance and a mechanical strength necessary for a supporting membrane.

The burst strength of the hydrocarbon cation exchange resin membrane is preferably 0.08 to 1.0 MPa. When the burst strength is less than 0.08 MPa, the membrane is inferior in mechanical strength. As a result, cracking tends to appear when the membrane is assembled into a fuel cell. Further, since such a burst strength is small, pinholes are generated in the membrane in some cases by the carbon fiber which constitutes the carbon paper ordinarily used as a gas diffusion electrode. Further, the burst strength is preferably 0.1 MPa or more for the stable operation of fuel cell over a long period of time. In general, the upper limit of burst strength of membrane, achievable in production is 1.0 MPa.

The adhesive layer is laminated on the hydrocarbon cation exchange resin membrane to form one piece with the exchange membrane.

The thickness of the adhesive layer is preferably 0.1 to 20 μm, more preferably 0.5 to 10 μm. The adhesive layer is constituted by a hydrocarbon cation exchange resin which is soft and has a Young's modulus of 1 to 300 MPa (hereinafter, this resin is referred to as "soft cation exchange resin for adhesive layer" in some cases).

Incidentally, the Young's modulus is measured by the following method. That is, a cast film made of a soft cation exchange resin for adhesive layer is produced, and the cast film is placed in an atmosphere of 25° C. and 60% RH for at least 24 hours for humidity adjustment. Then, the cast film is subjected to a test by an tensile tester or the like in the same atmosphere, to prepare a curve showing the stress-strain relation of the cast film. Using the inclination of the first linear part of the curve, there is calculated the Young's modulus of the soft cation exchange resin for adhesive layer. As the material for adhesive layer, there is particularly preferred a soft cation exchange resin in which a cation exchange group is covalently bonded to a thermoplastic elastomer of high elastic modulus. The soft cation exchange resin for adhesive layer is a hydrocarbon ion exchange resin. In order to enhance the bonding property between the hydrocarbon cation exchange resin membrane and the adhesive layer, it is important that the adhesive layer is a hydrocarbon ion exchange resin. When a fluorine-based adhesive layer is adhered to the hydrocarbon cation exchange resin membrane, the affinity between them is low, resulting in insufficient bonding strength.

The Young's modulus of the adhesive layer in the above mentioned conditions, i.e. 25° C. and 60% RH is 1 to 300 MPa, preferably 3 to 100 MPa. By using, as the adhesive layer, a soft cation exchange resin having the above Young's modulus in the above conditions, there can be obtained a cell membrane which has high proton conductivity and sufficient non-permeability to liquid fuel under the operating conditions of fuel cell, which hardly causes peeling between the adhesive layer and the hydrocarbon cation exchange resin membrane, and which is stable.

Here, as the soft cation exchange resin for adhesive layer, there is preferred one in which all the portion other than the cation exchange group is constituted by a hydrocarbon elastomer; however, there is also included, besides the above resin, one in which the most portion of main chain and side chain is formed by carbon and hydrogen. The hydrocarbon polymer may have, between the carbon-carbon linkages constituting the main chain and the side chain, an ether bond, an ester bond, an amide bond, a siloxane bond or the like and may contain a small amount of an atom deriving from the bond, such as oxygen, nitrogen, silicon, sulfur, boron, phosphorus or the like. The amount of the atom is 40 mol % or less, preferably 10 mol % or less.

As the group other than the cation exchange group, which may be bonded to the main chain and the side chain, there can be mentioned, besides hydrogen, a small amount of an atom (e.g. chlorine, bromine, fluorine or iodine) or other substituent. The amount of such an atom or substituent is preferably 40 mol % or less of the hydrogen atm contained in the hydrocarbon polymer, more preferably 10 mol % or less.

As the hydrocarbon polymer constituting the main chain of the soft cation exchange resin for adhesive layer, there are preferred a block copolymer or random copolymer between aromatic vinyl compound and conjugated diene compound; and a block copolymer or random copolymer, which is obtained by hydrogenating the conjugated diene moiety of the block copolymer between aromatic vinyl compound and conjugated diene compound, to partially or wholly saturate the double bonds in the main chain of the copolymer. These block copolymers or random copolymers are each a hydrocarbon polymer which is generically named as styrene-based elastomer. As the form of the block copolymers, there are mentioned di-block copolymer, tri-block copolymer, multi-block copolymer, etc. and, of these, tri-block copolymer is preferred.

In the block copolymer or random copolymer, the content of the aromatic vinyl monomer unit is not particularly restricted. However, the content is preferably 5 to 70% by mass, more preferably 10 to 50% by mass. By controlling the content in this range, the membrane after introduction of cation exchange group has electrical properties and mechanical properties, of intended levels. The block copolymer or random copolymer obtained has an average molecular weight of preferably 5,000 to 300,000, more preferably 10,000 to 150,000.

The styrene-based elastomer can be obtained by copolymerizing an aromatic vinyl compound and a conjugated diene compound by a known polymerization method such as anionic polymerization, cationic polymerization, coordination polymerization, radical polymerization or the like. An elastomer obtained by living anionic polymerization is preferred particularly.

When the conjugated diene moiety of the block copolymer or random copolymer is hydrogenated, the hydrogenation ratio is preferably 95% or more.

As specific examples of the styrene-based elastomer, there can be mentioned a polystyrene-polybutadiene-polystyrene tri-block copolymer (SBS) and a polystyrene-polyisoprene-polystyrene tri-block copolymer (SIS); and a polystyrene-poly(ethylene-butylene)-polystyrene tri-block copolymer (SEBS) and a polystyrene-poly(ethylene-propylene)-polystyrene tri-block copolymer (SEPS), respectively obtained by hydrogenating the SBS and the SIS. There can also be used a styrene-butadiene random copolymer, a styrene-propylene random copolymer, a styrene-ethylene random copolymer, a styrene-ethylene-butylene random copolymer, etc.

Particularly preferred are a polystyrene-poly(ethylene-butylene)-polystyrene tri-block copolymer (SEBS) and a polystyrene-poly(ethylene-propylene)-polystyrene tri-block copolymer (SEPS) because they have flexibility and hardly cause a side reaction in the step of introduction of ion exchange group into styrene-based elastomer.

In producing the soft cation exchange resin for adhesive layer, the hydrocarbon polymer as a raw material is as necessary subjected to a known treatment such as sulfonation, chlorosulfonation, conversion into phosphonium, hydrolysis or the like, whereby an intended cation exchange group can be introduced to the raw material polymer.

The cation exchange group covalently bonded to the soft cation exchange resin for adhesive layer is a functional group having a negative charge and proton (hydrogen ion) conductivity. Specifically, there can be mentioned a sulfonic group, a carboxyl group, a phosphonic group, etc. and particularly preferred is a sulfonic group.

The cation exchange capacity of the soft cation exchange resin for adhesive layer is preferably 0.1 to 5.0 mmol/g, more preferably 0.5 to 3.0 mmol/g. The cation exchange resin for adhesive layer having cation exchange capacity of this range has good ion conductivity. The soft cation exchange resin for adhesive layer, when it is non-crosslinked, dissolves in water when its cation exchange capacity is high. Therefore, in this case, the cation exchange capacity is preferably 0.5 to 2.5 mmol/g.

When a polymer electrolyte fuel cell is in a stage of electricity generation, there is present, inside the fuel cell system, a moisture needed for electricity generation and water generated in electricity generation. When the soft cation exchange resin for adhesive layer is soluble in water, the soft cation exchange resin for adhesive layer is dissolved by the water generated in electricity generation and is discharged outside the fuel cell system. As a result, the high capability for power supply is not maintained stably. For this reason, the soft cation exchange resin for adhesive layer needs to be sparingly soluble in water. Specifically explaining, the solubility in water is less than 1% by mass.

Here, "sparingly soluble in water" refers to that the solubility in water of 20° C. is less than 1% by mass, preferably less than 0.8% by mass. When the solubility in water is more than the above value, the amount of the soft cation exchange resin for adhesive layer, dissolving out from the gas diffusion electrode during the electricity generation of fuel cell, is large.

Similarly, when there is used a liquid fuel, the solubility of the soft cation exchange resin for adhesive layer in the liquid fuel is preferably less tan 1% by mass. Methanol is used widely as the liquid fuel. Methanol has high solvency as compared with many other liquid fuels. Therefore, if the soft cation exchange resin for adhesive layer in the liquid is sparingly soluble in methanol, there is no problem in using other liquid fuel.

"Sparingly soluble in methanol" refers to that the solubility in methanol of 20° C. is less than 1% by mass, preferably less than 0.8% by mass. When the solubility in methanol is more than the above value, the amount of the soft cation exchange resin for adhesive layer, dissolving out from the gas diffusion electrode during the electricity generation of fuel cell, is large.

The soft cation exchange resin for adhesive layer may be other than the styrene-based elastomer described above in detail, and may be selected appropriately from those known as a cation exchange resin or may be synthesized appropriately. In the case of synthesis, the solubility of the synthesis product in organic solvents or water can be adjusted by selection of monomer(s) to be polymerized or by control of crosslinking degree, amount of cation exchange group introduced, polymerization degree of resin, etc. In general, the solubility adjustment by control of crosslinking degree is preferred. The control of crosslinking degree can be conducted by changing the addition amount of crosslinkable monomer or by making molecular design so that a polymer chain or segment of high cohesive force forms a physical crosslinking site.

The soft cation exchange resin constituting the adhesive layer can be produced by polymerizing or condensing a functional group-containing monomer into which a cation exchange group can be introduced and, as necessary, a small amount of a crosslinkable monomer, to obtain a hydrocarbon polymer and then introducing a cation exchange group into the hydrocarbon polymer. Or, the soft cation exchange resin can be produced by polymerizing or condensing a monomer having a cation exchange group and, as necessary, a small amount of a crosslinkable monomer.

As the functional group-containing monomer into which a cation exchange group can be introduced, there can be mentioned aromatic vinyl compounds such as styrene, α-methylstyrene, 3-methylstyrene, 4-methylstyrene, 2,4-dimethylstyrene, p-tert-butylstyrene, α-halogenated styrene, vinylnaphthalene and the like. They can be used singly or in admixture of two or more kinds. Styrene and α-methylstyrene are preferred in view of the easiness of introduction of sulfonic group.

As the monomer having a cation exchange group, there can be mentioned, for example, sulfonic acid type monomers such as styrenesulfonic acid, vinylsulfonic acid, α-halogenated vinylsulfonic acid and the like; carboxylic acid type monomers such as methacrylic acid, acrylic acid, maleic anhydride and the like; phosphonic acid type monomers such as vinylphosphoric acid and the like; and salts and esters thereof.

As to the crosslinkable monomer, there is no particular restriction. There can be mentioned, for example, polyfunctional vinyl compounds such as divinylbenzene, divinylsulfone, butadiene, chloroprene, divinylbiphenyl, trivinylbenzene and the like; and polyfunctional methacrylic acid derivatives such as trimethylolmethane trimethacrylate, methylenebisacrylamide, hexamethylenedimethacrylamide and the like.

The use amount of the crosslinkable monomer generally is 0 to 5 parts by mass, preferably 0.01 to 5 parts by mass, more preferably 0.05 to 1 part by mass relative to 100 parts by mass of the functional group-containing monomer into which a cation exchange group can be introduced or the monomer having a cation exchange group. When the use amount of the crosslinkable monomer is less than 0.01 part by mass, the obtained soft cation exchange resin for adhesive layer tends to dissolve in water. When the use amount of the crosslinkable monomer is more than 5% by mass, the obtained resin is insoluble in organic solvents, making difficult the handling of the resin in the production step of membrane.

Besides the functional group-containing monomer into which a cation exchange group can be introduced or the monomer having a cation exchange group and the crosslinkable monomer, there may be added, as necessary, other monomer copolymerizable with these monomers or a plasticizer.

As the other monomer, there can be mentioned, for example, vinyl compounds such as ethylene, propylene, butylene, styrene, acrylonitrile, methylstyrene, acrolein, methyl vinyl ketone, vinylbiphenyl and the like; and conjugated diene compounds such as butadiene, isoprene, 1,3-pentadiene, 2,3-dimethyl-1,3-butadiene and the like. The use amount of the other monomer is preferably 0 to 100 parts by mass relative to 100 parts by mass of the functional group-containing monomer into which a cation exchange group can be introduced or the monomer having a cation exchange group.

As the plasticizer, there can be mentioned, for example, dibutyl phthalate, dioctyl phthalate, dimethyl isophthalate, dibutyl adipate, triethyl citrate, acetyl tributyl citrate, and dibutyl sebacate. The use amount of the plasticizer is preferably 0 to 50 parts by mass relative to 100 parts by mass of the functional group-containing monomer into which a cation exchange group can be introduced or the monomer having a cation exchange group.

As the method for polymerization of the monomers composition comprising the above-mentioned monomer and crosslinkable monomer, there can be used a known method such as bulk polymerization, solution polymerization, suspension polymerization, emulsion polymerization or the like. The polymerization method to be used varies depending upon, for example, the formulation of monomers composition and is determined appropriately.

For example, when the above-mentioned monomer is polymerized using no crosslinkable monomer to produce a soft cation exchange resin for adhesive layer, having the above-mentioned properties, there are selected polymerization conditions capable of giving a polymer having an average molecular weight of 5,000 to 1,000,000, preferably 10,000 to 200,000.

By using, as the material for adhesive layer, the above-mentioned soft cation exchange resin for adhesive layer, the bonding strength between catalyst electrode layer and hydrocarbon cation exchange resin membrane is enhanced strikingly and the durability of fuel cell in long-term use is improved greatly. Further, the proton conductivity between catalyst electrode layer and hydrocarbon cation exchange resin membrane is enhanced.

The soft cation exchange resin for adhesive layer is preferred to be soluble in at least one kind of organic solvent other than methanol, because it (being soluble) makes easy the operation of adhesive layer production.

As to the solvent for the soft cation exchange resin for adhesive layer, there is no particular restriction. The solvent may be appropriately selected depending upon the weight-average molecular weight or structure of the soft cation exchange resin to be dissolved. Specifically, there is preferred a polar solvent having a low melting point (20° C. or less) and a dielectric constant of 15 or more. As such a polar solvent, there can be mentioned, for example, ethanol, 1-propanol, 2-propanol, N-butanol, methyl ethyl ketone, acetonitrile, nitromethane, dimethyl sulfoxide, N-methylpyrrolidone, N,N-dimethylformamide, N,N-dimethylacetamide and tetrahydrofuran.

When the content of the cation exchange group bonded to the soft cation exchange resin for adhesive layer is relatively small, it is possible to use the above-mentioned polar solvent as a mixture with a non-polar solvent such as 1,2-dichloromethane, trichloroethane, toluene, xylene or the like, in order to enhance the solvency for the soft cation exchange resin. When the organic solvent used is soluble in water, the organic solvent may be used as a mixture with water as long as the solvency for the soft cation exchange resin for adhesive layer is not impaired.

Incidentally, "soluble in organic solvent" refers to that a dried resin has a saturation solubility of 1% by mass or more, preferably 3% by mass or more at atmospheric pressure at 20° C. However, even if a resin is sparingly soluble at 20° C., the resin can be used for formation of adhesive layer if the resin can be made into a solution of soft cation exchange resin for adhesive layer by selecting a solvent capable of dissolving the resin by heating or pressurization.

The fuel cell membrane of the present invention comprises a hydrocarbon cation exchange resin membrane and an adhesive layer constituted by the above-mentioned soft cation exchange resin for adhesive layer and formed on at least one side of the membrane. The adhesive layer may be formed on both sides of the membrane.

As to the method for forming an adhesive layer between a hydrocarbon cation exchange resin membrane and a catalyst electrode layer, there is no particular restriction. For example, a solution of a soft cation exchange resin for adhesive layer is coated on one side of a catalyst electrode layer and is dried; the soft cation exchange resin-coated side of the catalyst electrode layer is bonded to a hydrocarbon cation exchange resin membrane; thereby, an adhesive layer can be formed between the hydrocarbon cation exchange resin membrane and the catalyst electrode layer. In this case, however, there is a case that the solution of a soft cation exchange resin for adhesive layer infiltrates into the catalyst electrode layer and the resin cover the catalyst in an amount more than necessary. In this case, the active area of catalyst is decreased; therefore, it is desired to form an adhesive layer on the hydrocarbon cation exchange resin membrane.

As to the concentration of the solution of a soft cation exchange resin for adhesive layer, to be coated for formation of adhesive layer, there is no particular restriction. However, the concentration is generally preferred to be 0.01 to 10% by mass, more preferred to be 0.05 to 5% by mass.

As to the method for forming an adhesive layer on the hydrocarbon cation exchange resin membrane, there is no particular restriction. For example, there is the following method. A solution of a soft cation exchange resin for adhesive layer is coated on a polytetrafluoroethylene sheet, followed by drying, to form a thin film of a soft cation exchange resin on the polytetrafluoroethylene sheet. Then, this thin film is transferred onto a crosslinked cation exchange resin membrane by a method such as hot pressing or the like. Further, there is a method of contacting a solution of a soft cation exchange resin for adhesive layer with a hydrocarbon cation exchange resin membrane, followed by drying. As to the method for contacting the solution of soft cation exchange resin for adhesive layer with the hydrocarbon cation exchange resin membrane, there is no particular restriction, either. There can be mentioned, for example, a method of coating or spraying the solution of a soft cation exchange resin for adhesive layer on the hydrocarbon cation exchange resin membrane, or a method of immersing the hydrocarbon cation exchange resin membrane in the solution of a soft cation exchange resin for adhesive layer. The method of immersion is preferred because it allows for easy production. In the case of the immersion method, the immersion time is generally preferred to be 1 minute to 24 hours. In the case of immersion method, an adhesive layer is ordinarily formed on both sides of the hydrocarbon cation exchange resin membrane.

Then, the hydrocarbon cation exchange resin membrane contacted with the solution of a soft cation exchange resin for adhesive layer is taken out from the solution, and the membrane is dried for solvent removal. There is no particular restriction as to the method for this drying, and the drying is conducted ordinarily at 0 to 100° C. for 1 minute to 5 hours. For sufficient drying, there may be employed spraying of hot air or the like, or drying under reduced pressure. The drying may be conducted in an inert atmosphere such as argon, nitrogen or the like. In the drying, it is preferred that the hydrocarbon cation exchange resin membrane is dried with a tension being applied to the membrane by, for example, horizontally fixing the membrane to a frame, in order to avoid a case that the removal of solvent becomes non-uniform and the adhesion amount of soft cation exchange resin for adhesive layer becomes non-uniform.

As above, the membrane for fuel cell, of the present invention is obtained.

Second Embodiment of Membrane

Figure 4:
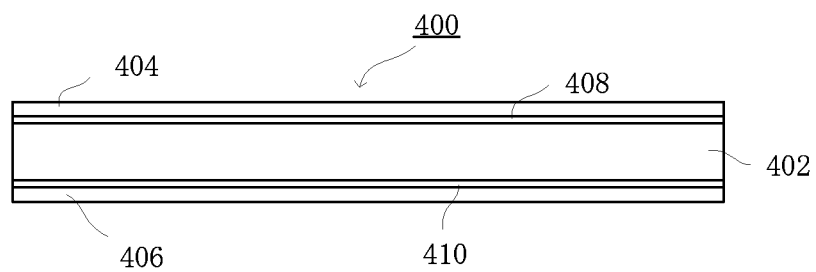
FIG. 4 is a conceptual drawing of a constitution of the second embodiment of the hydrocarbon cation exchange resin membrane of the present invention.

In FIG. 4 is shown a constitution of the second embodiment of the membrane for polymer electrolyte fuel cell, of the present invention.

In FIG. 4, 400 is a membrane for polymer electrolyte fuel cell, wherein an intermediate layer 408 is formed between a hydrocarbon cation exchange resin membrane 402 and an adhesive layer 404 and an intermediate layer 410 is formed between the hydrocarbon cation exchange resin membrane 402 and an adhesive layer 406.

Figure 5:
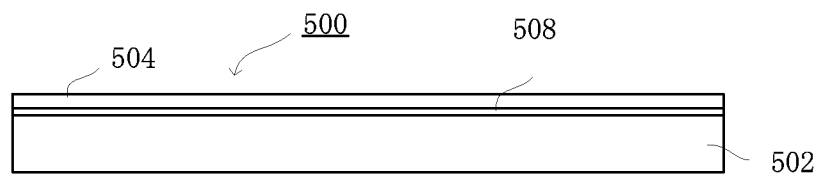
FIG. 5 is a conceptual drawing of other constitution of the second embodiment of the hydrocarbon cation exchange resin membrane of the present invention.

FIG. 5 shows other constitution of the second embodiment of the membrane for polymer electrolyte fuel cell, of the present invention. In FIG. 5, 500 is a membrane, in which an adhesive layer 504 is formed only at one side of a hydrocarbon cation exchange resin membrane 502 and an intermediate layer 508 is formed between the hydrocarbon cation exchange resin membrane 502 and the adhesive layer 504.

In the second embodiment of membrane, the hydrocarbon cation exchange resin membranes 402 and 502 and the adhesive layers 404, 406 and 504 are respectively the same as those described in the first embodiment of membrane; therefore, the descriptions thereof are not made.

The intermediate layer resin constituting the intermediate layers 410, 408 and 508 is composed of a hydrocarbon anion exchange resin.

In the second embodiment of the membrane for polymer electrolyte fuel cell of the present invention, there is interposed, between a hydrocarbon cation exchange resin membrane (functioning as a solid polymer electrolyte) and an adhesive layer, a hydrocarbon anion exchange resin having an anion exchange group which has a polarity opposite to that of the cation exchange group possessed by the membrane.

As the anion exchange resin constituting the intermediate layer, there is preferred one in which all the portion other than the anion exchange group is constituted by hydrocarbon; however, there is also included, besides the above resin, one in which the most portion of main chain and side chain is formed by carbon and hydrogen. The hydrocarbon polymer may have, between the carbon-carbon linkages constituting the main chain and the side chain, an ether bond, an ester bond, an amide bond, a siloxane bond or the like. In this case, the hydrocarbon polymer contains a small amount of an atom deriving from the bond, such as oxygen, nitrogen, silicon, sulfur, boron, phosphorus or the like. The amount of the atom is 40 mol % or less, preferably 10 mol % or less.

To the main chain and the side chain may be bonded a group other than the anion exchange group. Such a group may be, besides hydrogen, a small amount of an atom (e.g. chlorine, bromine, fluorine or iodine) or other substituent. The amount of such an atom or substituent is preferably 40 mol % or less of the total hydrogen present, more preferably 10 mol % or less.

The cation exchange group possessed by the cation exchange resin membrane and the anion exchange group possessed by the anion exchange resin adhering to the surface of the cation exchange resin membrane are opposite to each other in polarity; therefore, they form an ionic bond at their interface. As a result, the cation exchange resin membrane and the intermediate layer are bonded more strongly owing to the adhesivity based on ordinary affinity plus the adhesivity based on the ionic bond.

Further, the adhesive layer, which is laminated on the intermediate layer having an anion exchange group, has an cation exchange group. Therefore, the anion exchange group of the intermediate layer and the cation exchange group of the adhesive layer form a strong ionic bond similarly to the above case. As a result, the intermediate layer and the adhesive layer are bonded more strongly owing to the adhesivity based on ordinary affinity plus the adhesivity based on the ionic bond.

As described above, the cation exchange resin membrane and the adhesive layer are bonded strongly to each other via the intermediate layer, whereby the peeling between them is suppressed strongly.

As to the anion exchange group, there is no particular restriction. There can be mentioned, for example, primary to tertiary amino groups, quaternary ammonium group, pyridyl group, imidazole group, quaternary pyridinium group and quaternary imidazolium group. Preferred as the anion exchange group are primary to tertiary amino groups, pyridyl group and imidazole group because the above-mentioned ionic bond is maintained stably even if other ionic species is present in the vicinity of the ionic bond, and most preferred is pyridyl group. These ion exchange groups may be present singly or in admixture of two or more kinds. Further, a cation exchange group and an anion exchange group may be present in combination. In this case, the polarity possessed by more than half of the total ion exchange groups of the ion exchange resin is regarded as the polarity of the ion exchange resin.

As to the method for forming the intermediate layer made of a hydrocarbon anion exchange resin, between the hydrocarbon cation exchange resin membrane and the adhesive layer, there is no particular restriction, and any method may be employed. As the specific method for forming the intermediate layer, there is the following method. First, a solution of an anion exchange resin to be become an intermediate layer is coated on a polytetrafluoroethylene sheet, followed by drying, to form a thin film of the anion exchange resin on the surface of the sheet. Then, the thin film formed on the sheet surface is transferred onto a cation exchange resin membrane to form an intermediate layer on the cation exchange resin membrane. The method for transfer includes hot pressing, etc.

As other method for forming the intermediate layer, there is a method of polymerizing a raw material monomer for anion exchange resin by plasma polymerization or the like and depositing the resulting anion exchange resin on the surface of a cation exchange resin membrane. However, the following method is preferred in view of simplicity of production and the high adhesivity of adhesive layer to cation exchange resin membrane.

That is, it is a method of contacting a solution of an anion exchange resin with at least one side of a cation exchange resin membrane, followed by drying, to adhere the anion exchange resin (which becomes an intermediate layer) to the cation exchange resin membrane.

When, by the above method, an anion exchange resin layer (which becomes an intermediate layer) is laminated on a hydrocarbon cation exchange resin membrane or on an adhesive layer, the amount of the intermediate layer laminated can be controlled by adjusting the concentration of anion exchange resin solution used in the contact step, the time of contact with the solution, the conditions for washing, etc.

In the above method, as to the solvent used for dissolving the anion exchange resin, there is no particular restriction. The solvent may be appropriately selected according to the weight-average molecular weight and chemical structure of the anion exchange resin to be dissolved. Specifically, there can be mentioned alcohols such as methanol, ethanol, 1-butanol, 2-ethoxyethanol and the like; aliphatic hydrocarbons such as hexane, cyclohexane, heptane, 1-octane and the like; fatty acids such as octanoic acid and the like; amines such as dimethyloctylamine and the like; aromatic hydrocarbons such as toluene, xylene, naphthalene and the like; ketones such as acetone, cyclohexanone, methyl ethyl ketone and the like; ethers such as dibenzyl ether, diethylene glycol dimethyl ether and the like; halogenated hydrocarbons such as methylene chloride, chloroform, ethylene bromide and the like; alcohol esters of aromatic acid or aliphatic acid, such as dimethyl phthalate, dioctyl phthalate, dimethyl isophthalate, dibutyl adipate, triethyl citrate, acetyl tributyl citrate, dibutyl sebacate and the like; alkylphosphoric acid esters; and water.

As described above, in the lamination method of the anion exchange resin, the anion exchange resin solution is contacted with the cation exchange resin membrane. There is no particular restriction as to the method for contact, and there can be mentioned, for example, a method of coating or spraying an anion exchange resin solution on a cation exchange resin membrane, or immersing the cation exchange resin membrane in the anion exchange resin solution. The method of immersion is particularly preferred for the easy operation. In the case of the immersion method, the immersion time differs depending upon the kinds of cation exchange resin membrane and anion exchange resin, the concentration of anion exchange resin solution, and the kind of solvent. The immersion time is generally 1 minute to 24 hours. The immersion time is preferably 5 minutes or more so that an ionic bond is formed between the cation exchange group covalently bonded to the cation exchange resin membrane and the anion exchange group covalently bonded to the anion exchange resin and that the anion exchange resin adheres strongly to the surface of the cation exchange resin membrane. Meanwhile, the immersion time is preferably not more than 15 hours in order to prevent the adhesion of a more-than-required amount of the anion exchange resin to the surface of the cation exchange resin membrane and resultant increase in the electric resistance of the fuel cell membrane obtained.

Then, the cation exchange resin membrane immersed in the anion exchange resin solution is taken out from the solution and, as necessary, drying is conducted to remove the solvent. When the solvent used for dissolving the anion exchange resin is a solvent of high dielectric constant or when the solubility of the anion exchange resin in the solvent is high, there is a case in which no sufficient ion pair is formed between the cation exchange group covalently bonded to the cation exchange resin membrane and the anion exchange group covalently bonded to the anion exchange resin. In such a case, formation of ion pair can be promoted by drying the cation exchange resin membrane.

There is no particular restriction as to the method for drying, and the drying may be conducted at 0 to 100° C. for 1 minute to 5 hours depending upon the concentration of anion exchange resin solution used and the solvent used. For sufficient drying, the drying may be conducted by spraying of hot air, or under reduced pressure, or in an inert atmosphere such as argon, nitrogen or the like. The drying is conducted preferably with a tension being applied to the cation exchange resin membrane. For applying a tension, there is, for example, a method of fixing the cation exchange resin membrane immersed in the anion exchange resin solution, to a frame. When the solvent has been removed non-uniformly, there is a problem that the anion exchange resin adheres non-uniformly to the surface of the cation exchange resin membrane. This problem can be avoided by employing the above method of applying a tension.

There may be a case that the anion exchange resin adhered to the cation exchange resin membrane by the above-mentioned adhesion method includes a portion which adheres merely to the cation exchange resin membrane without forming an ion pair with the cation exchange group of the cation exchange resin membrane. When there is used, as a fuel cell membrane, a cation exchange resin membrane containing an anion exchange resin portion having no ion pair formed with the cation exchange group of the membrane, there is a risk that the anion exchange resin portion having no ion pair formed poisons the catalyst of catalyst electrode layer and, as a result, the output of fuel cell is reduced.

In order to solve this problem, it is preferred to wash the fuel cell membrane obtained, with a solvent.

As to the solvent used for washing, there is no particular restriction as long as the solvent is capable of dissolving the anion exchange resin adhered. The solvent used for washing may be appropriately selected depending upon the weight-average molecular weight and chemical structure of the anion exchange resin. Specifically, there can be used the same solvent as used in preparation of the anion exchange resin solution in the adhesion step.

There is no particular restriction as to the washing method. There is preferred, in view of the simple operation, a washing method of immersing the cation exchange resin membrane having the anion exchange resin adhered, in the above-mentioned solvent, to conduct washing.

There is no particular restriction as to the conditions for washing by immersion. However, the immersion in solvent is preferably conducted at 0 to 100° C. for 10 minutes to 24 hours. For higher washing efficiency, it is effective to use a fresh solvent every time and conduct immersion 2 to 5 times. In this case, the total immersion time is preferably 10 minutes to 10 hours.

Then, the cation exchange resin membrane having the anion exchange resin adhered is taken out from the solvent used for washing and is dried to remove the solvent, to obtain a fuel cell membrane of the present invention. As to the drying method, there is no particular restriction as long as the method enables substantial removal of the solvent from inside the membrane obtained. The conditions for drying are selected to be 0 to 100° C. and 1 minute to 5 hours depending upon the kind of the solvent. For sufficient drying, the drying may be conducted by spraying of hot air to the membrane, or under reduced pressure, or in an inert atmosphere such as argon, nitrogen or the like. In the drying, it is preferred to adopt, for example, a method of fixing the membrane to a frame and conduct drying with a tension being applied to the membrane. The application of a tension to the membrane can prevent non-uniform removal of solvent and resultant appearance of strain in membrane.

The weight-average molecular weight of the anion exchange resin constituting the intermediate layer is preferably 5,000 to 1,000,000. When the weight-average molecular weight is 5,000 or less, the anion exchange resin tends to infiltrate into the cation exchange resin membrane in the step of adhering the anion exchange resin to the cation exchange resin membrane. As a result, there arises a reduction in the density of the anion exchange group adhering to the surface of the cation exchange resin membrane. In this case, the electrostatic attraction between the cation exchange group of the cation exchange resin membrane or the adhesive layer and the anion exchange group becomes weak. As a result, the bonding strength between the cation exchange resin membrane and the adhesive layer becomes insufficient.

In order to make sufficient the bonding strength between them, the weight-average molecular weight of the anion exchange resin is more preferably 30,000 or more, particularly preferably 100,000 or more. When the weight-average molecular weight of the anion exchange resin is more than 1,000,000, the solubility of the anion exchange resin is low. As a result, it is difficult to prepare an anion exchange resin solution which is used in the step of adhering the anion exchange resin to the cation exchange resin membrane. In order to prepare a uniform solution and achieve good bonding between the cation exchange resin membrane and the anion exchange resin, the weight-average molecular weight of the anion exchange resin is preferably 300,000 or less, more preferably 250,000 or less.

As to the amount of the anion exchange resin adhered to the cation exchange resin membrane, there is no particular restriction. However, the adhesion amount is preferably 0.0001 to 0.5 mg/cm$^2$. When the adhesion amount of the anion exchange resin is less than 0.0001 mg/cm$^2$, the amount of ion pair formed is insufficient and the bonding between the two is insufficient. When the adhesion amount of the anion exchange resin is more than 0.5 mg/cm$^2$, the electrical resistance of the intermediate layer is high, which is not preferred. The adhesion amount of the anion exchange resin is more preferably 0.0003 to 0.3 mg/cm$^2$, particularly preferably 0.0001 to 0.1 mg/cm$^2$.

The amount of the anion exchange resin adhered to the cation exchange resin membrane can be measured by the method described below. That is, when the adhesion amount is 0.001 to 0.5 mg/cm$^2$, the adhesion amount can be determined by the following method.

First, there are prepared two same cation exchange resin membrane sheets to which an anion exchange resin has been adhered. The side of each sheet on which the anion exchange resin has been adhered, is placed on the upper and lower sides of a germanium optical crystal. Thereby, a to-be-measured sample is prepared. Then, the incident angle of infrared radiation upon the cation exchange resin membrane placed on the crystal is set at 45°. Then, the multiple reflection infrared spectrum is measured by the total reflection absorption spectrum analysis. Using the spectrum obtained, a characteristic absorption intensity based on the anion exchange group possessed by the anion exchange resin is determined.

Meanwhile, there are prepared a plurality of standard samples obtained by coating a known amount of an anion exchange resin on one side of a polyethylene terephthalate film. In a manner similar to the above, characteristic absorption spectra are determined from the spectra obtained with the standard samples. Using these data, there is prepared a calibration curve showing a relation between the anion exchange resin and the characteristic absorption intensity of spectrum. Using this calibration curve, there is calculated the adhesion amount (per unit area cm$^2$) of anion exchange resin corresponding to the absorption intensity of the measured sample (hereinafter, this measurement method is referred to as "ATR method").

In this ATR method, there is used, as the germanium optical crystal, one having a size of 20 mm×50 mm×3 mm. As the cation exchange membrane used for measurement, there is used one having an area of 10 mm×45 mm.

The characteristic absorption based on the anion exchange group possessed by the anion exchange resin is defined as follows. For example, when the anion exchange resin has a pyridyl group possessed by, for example, poly(4-vinylpyridine), the characteristic absorption is that of pyridyl group having an absorption at around 1,636 to 1,644 $cm^{-1}$. Similarly, when the anion exchange resin has an imine group possessed by, for example, polyethylene imine, the characteristic absorption is that of imine group having an absorption at around 1,637 to 1,645 $cm^{-1}$.

In the ATR method, the infrared radiation used for measurement permeates through the anion exchange resin and then does not permeate from around the surface layer of the cation exchange resin membrane deep into the membrane. Therefore, the amount of the anion exchange resin present in the vicinity of the surface of the cation exchange membrane can be measured accurately. Thus, the substantial amount of the anion exchange resin adhering to the surface of the cation exchange resin membrane can be determined.

The amount of the anion exchange resin adhering to the surface of the cation exchange resin membrane is not necessarily uniform. However, the very small difference in the adhesion amount in different places has substantially no influence on the result of measurement as long as there are used a germanium optical crystal having about the above-mentioned area and the measurement sample (cation exchange resin membrane) having about the above-mentioned size.

The adhesion amount of the anion exchange resin may be measured by the following solvent immersion method, in place of the ATR method. In this measurement method, first, a cation exchange resin membrane to which an anion exchange resin has been adhered, is immersed in an equal-mass, mixed solution of a 0.5 mol/l aqueous sodium hydroxide solution and methanol, for long hours. By this immersion, the anion exchange resin adhered to the surface of the membrane and the anion exchange resin which may be infiltrated into the membrane, are dissolved out completely. Then, the amount of the anion exchange resin dissolved out is quantitatively determined using an analytical apparatus such as liquid chromatography or the like.

The value obtained by dividing the mass of the anion exchange resin obtained by the solvent immersion method, by the total area ($cm^2$) of the membrane is a total adhesion amount of the anion exchange resin adhering to the membrane surface and further infiltrated into the membrane. Meanwhile, the amount of the anion exchange resin obtained by the ATR method is the amount of the anion exchange resin adhering to the membrane surface.

Here, it was confirmed that, when the hydrocarbon cation exchange resin membrane is a crosslinked type and the anion exchange resin has a weight-average molecular weight of 5,000 to 1,000,000, the total adhesion amount obtained by the solvent immersion method is ordinarily about the same as the adhesion amount obtained by the ATR method. It has been confirmed therefrom that, when the above anion exchange resin is adhered to the above cation exchange resin membrane, the anion exchange resin hardly infiltrates into the cation exchange resin membrane and the most part of the resin adheres to the surface of the membrane.

In the ATR method, the measurement accuracy is low when the adhesion amount of the anion exchange resin is less than 0.001 $mg/cm^2$. Therefore, when the amount of the anion exchange resin adhered to the surface of the cation exchange resin membrane is 0.0001 $mg/cm^2$ to less than 0.001 $mg/cm^2$, the accurate amount of the anion exchange resin adhered to the membrane surface can be determined by the following method which is an application method of solvent immersion method.

First, for the cation exchange resin membrane in which an intermediate layer made of an anion exchange resin has been formed, the total adhesion amount of the anion exchange resin is determined by conducting the solvent immersion method.

Incidentally, the anion exchange resin hardly infiltrates into the cation exchange resin membrane and the most part thereof adheres to the membrane surface. Therefore, the total adhesion amount of the anion exchange resin obtained by the solvent immersion method is extremely close to the adhesion amount adhering only to the membrane surface.

In the application method of the solvent immersion method, after the obtainment of the total adhesion amount, the amount of the anion exchange resin infiltrated into the membrane is determined according to the procedure described below.

That is, there is prepared a cation exchange resin membrane on which an intermediate layer has been formed, produced by the same method. Then, the side of the membrane on which the intermediate layer has been formed, is subjected to sand blasting, to scrape off the surface portion in a thickness of 1 μm. To the thus-obtained membrane whose surface portion has been scraped off, is again applied the solvent immersion method to determine the adhesion amount of the anion exchange resin.

Incidentally, in the ATR method, the depth of infrared radiation permeation into the cation exchange membrane from its surface is estimated to be about 0.4 μm generally. Therefore, by scraping off the surface portion of the membrane in a thickness of 1 μm, the surface portion for which the surface adhesion amount of the anion exchange resin is measured by the ATR method, can be removed.

Lastly, by subtracting the amount of the anion exchange resin infiltrated into the membrane (the amount of the anion exchange resin after the surface portion has been scraped off) from the total adhesion amount obtained as above (the amount of the anion exchange resin before the scraping-off of the surface portion), there can be determined a more reliable amount of the anion exchange resin adhered to the surface of the cation exchange resin membrane.

In the application method of the solvent immersion method, the area of the membrane (to-be-measured sample) used is ordinarily 8 cm×8 cm. In this case, even if there is non-uniformity in the adhesion amount of anion exchange resin adhering to membrane surface, there is substantially no scattering in measurement results as long as a membrane having about the above area is used.

Incidentally, the amount of the anion exchange resin adhering to the surface of the solid polymer electrolyte membrane may be determined by a method other than the above method as long as the method has a correlation with the above method and can give substantially the same measurement value.

There is no particular restriction as to the adhesion form in which the anion exchange resin constituting the intermediate layer adheres to the surface of the cation exchange resin membrane. The intermediate layer may be formed so as to cover the whole one side of the cation exchange resin membrane, or may be formed on part of one side of the cation exchange resin membrane. When the intermediate layer adheres only to part of the surface of the cation exchange resin membrane, the adhesion area of the intermediate layer is preferred to be ½ or more of one side of the cation exchange resin membrane so that the obtained cation exchange resin membrane can have good bonding to the adhesive layer.

Incidentally, when the anion exchange resin constituting the intermediate layer is allowed to be present on part of the surface of the cation exchange resin membrane, the measurement of the adhesion amount of the cation exchange resin is conducted only for the membrane part to which the anion exchange resin is adhered.

As specific examples of the anion exchange resin used in the present invention, there can be mentioned poly(4-vinylpyridine), poly(2-vinylpyridine), polyethyleneimine, polyallylamine, polyaniline, polydiethylaminoethylstyrene, polyvinylimidazole, polybenzimidazole, polydimethylaminoethyl methacrylate, alkylation product of chloromethylated polystyrene, derivatives thereof, and complete or partial N-4 quaternization products thereof. Of these, preferred are tertiary nitrogen-containing anion exchange resins such as poly(4-vinylpyridine), poly(2-vinylpyridine), polyethyleneimine, polyallylamine, polyaniline, polyvinylimidazole, polybenzimidazole and the like; most preferred are polyvinylpyridines such as poly(4-vinylpyridine), poly(2-vinylpyridine) and the like.

An intermediate layer is adhered by the above-mentioned method and then an adhesive layer described in the first embodiment of membrane, of the present invention is formed on the surface of the intermediate layer, whereby a fuel cell membrane of second embodiment can be obtained.

By bonding a catalyst electrode layer to at least one side, preferably both sides of the membrane for fuel cell, of the present invention produced as above, there can be obtained a membrane-catalyst electrode assembly for polymer electrolyte fuel cell, of the present invention (hereinafter, the assembly is abbreviated as membrane-electrode assembly). As the catalyst electrode layer, there can be used a known catalyst electrode layer used in hydrogen fuel cell or direct liquid fuel cell, with no particular restriction.

The catalyst electrode layer comprises particles of catalyst metal and an ion-conductive substance. As the method for bonding the catalyst electrode layer and the fuel cell membrane, there is a method of bonding a catalyst electrode layer loaded on one side of a conductive porous electrode material, to the surface of the fuel cell membrane of the present invention. Or, there is a method of bonding a catalyst electrode layer alone to the fuel cell membrane and laminating thereon an electrode made of a porous material. The bonding method is described later.

Into the catalyst electrode layer is infiltrated a proton-conductive substance. The proton-conductive substance has an ion exchange group having the same polarity as the ion-exchange group possessed by the hydrocarbon cation exchange membrane has. As to the proton-conductive substance, there is no particular restriction except that it has an ion exchange group having the same polarity as the electrolyte membrane has, and any known proton-conductive substance can be used. As specific examples of the proton-conductive substance, there can be mentioned perfluorocarbonsulfonic acids such as Nafion (trade name, a product of Du Pont) and the like; sulfonation products or alkylsulfonation products of engineering plastics such as polyetherether ketone, polysulfone, polyethersulfone, polybenzimidazole, polyvinylimidazole, polyoxazole, polyphenylene oxide, polyphenylene sulfide and the like; sulfonation products of elastomers such as polystyrene-poly(ethylene-butylene)-polystyrene tri-block copolymer, polystyrene-poly(ethylene-propylene)-polystyrene tri-block copolymer and the like; polystyrenesulfonic acid; and derivatives thereof.

As the catalyst of the catalyst electrode layer, any metal capable of promoting the oxidation reaction of fuel (e.g. hydrogen or methanol) and the reduction reaction of oxygen can used with no particular restriction. There can be mentioned, for example, platinum, gold, silver, palladium, iridium, rhodium, ruthenium, tin, iron, cobalt, nickel, molybdenum, tungsten, vanadium and alloys thereof. Of these catalysts, preferred are platinum, ruthenium and a platinum-ruthenium alloy, all of which are superior in catalytic activity.

A particularly preferred catalyst electrode layer is one comprising a carrier made of carbon black (e.g. furnace black or acetylene black) or conductive carbon (e.g. carbon black, active carbon or graphite), and the above-mentioned catalyst loaded thereon. As the conductive carbon having a catalyst loaded thereon, any known such conductive carbon can be used. The conductive carbon having a catalyst loaded thereon, usable as the electrode for fuel cell is described in, for example, JP-A-2002-329500, JP-A-2002-100373, JP-A-1995-246336, etc. Or, various catalyst electrode layers different in catalyst and carrier are available commercially, and they can be used per se or after applying a necessary treatment thereto.

The diameters of the particles of catalyst metal are ordinarily 0.1 to 100 nm, preferably 0.5 to 10 nm. Smaller diameters give higher catalytic action, but metal particles having diameters of less than 0.5 nm are difficult to produce. When the particle diameters are more than 100 nm, sufficient catalytic action is unlikely to be obtained.

The content of the catalyst metal is ordinarily 0.01 to 10 mg/cm$^2$, preferably 0.1 to 5.0 mg/cm$^2$ when the electrode catalyst layer is made into a sheet. When the content of the catalyst is less than 0.01 mg/cm$^2$, no sufficient catalyst action is exhibited and, when the content is more than 10 mg/cm$^2$, the catalyst ability is saturated.

By bonding the catalyst electrode layer comprising the above components and the fuel cell membrane of the present invention, there can be obtained a membrane-catalyst electrode assembly for fuel cell. The catalyst electrode layer is preferably formed on the surface of the fuel cell membrane in a thickness of 5 to 50 μm. The catalyst electrode layer is preferably formed on the surface of the adhesive layer of the fuel cell membrane.

Generally, in producing the catalyst electrode layer, a catalyst electrode paste (which is a mixture of the above-mentioned components and an organic solvent) is coated on the surface of membrane, followed by drying. As the method for coating, screen printing or spraying can be mentioned, for example. The control of the loaded catalyst amount and the thickness of the catalyst electrode layer is conducted by adjusting the viscosity of the catalyst electrode paste. The adjustment of the viscosity is conducted by adjusting the amount of the organic solvent added to the catalyst electrode paste.

As the method for directly forming the catalyst electrode layer on the fuel cell membrane of the present invention, there can be preferably used a method of forming, in advance, a catalyst electrode layer on a polytetrafluoroethylene or polyester film and transferring the catalyst electrode layer onto a fuel cell membrane. In this case, the transfer of the catalyst electrode layer is conducted generally by bonding the catalyst electrode layer to the membrane by thermocompression bonding using an apparatus capable of applying a pressure and a heat, such as hot press, roll press or the like. The pressing temperature is generally 80° C. to 200° C. The pressing pressure is ordinarily 0.5 to 20 MPa although it differs depending the thickness and hardness of the catalyst electrode layer used.

The fuel cell membrane-catalyst electrode assembly of the present invention may also be produced by loading a catalyst electrode layer on a porous electrode substrate as described above and then bonding the catalyst electrode layer to a membrane. As the porous electrode substrate, there can be mentioned, for example, carbon fiber woven cloth and carbon paper. The thickness of the electrode substrate is preferably 50 to 300 μm and the porosity thereof is preferably 50 to 90%. The membrane-catalyst electrode assembly may also be produced by coating the above-mentioned catalyst electrode paste on an electrode substrate, followed by drying, and then bonding the resulting catalyst electrode layer to the fuel cell membrane of the present invention by thermocompression bonding in the same manner as above.

Figure 1:
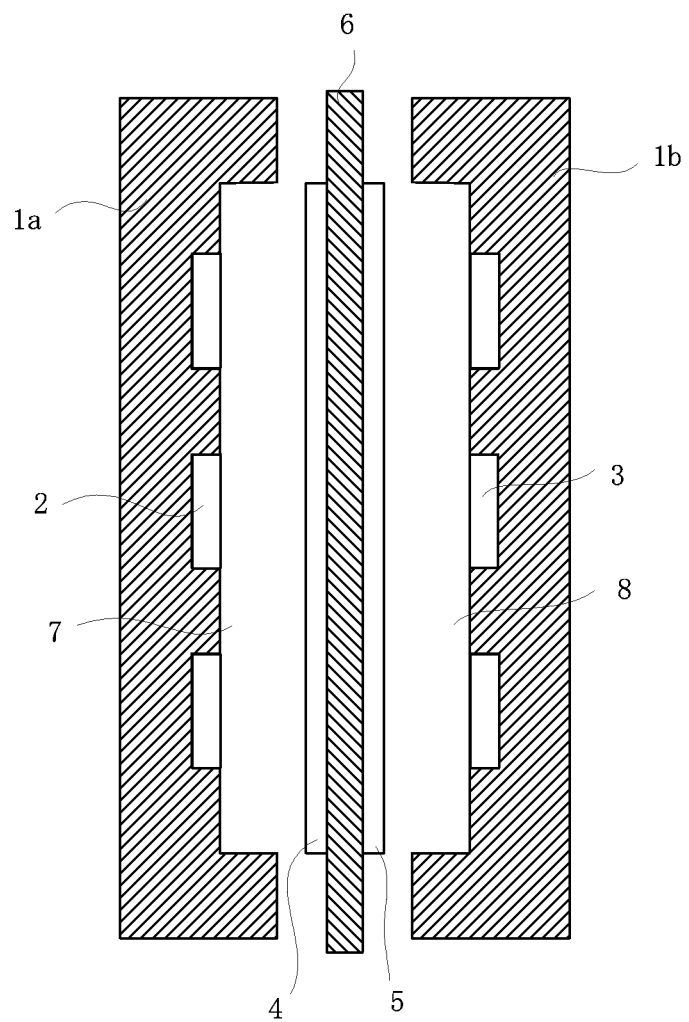
FIG. 1 is a conceptual drawing showing the basic structure of polymer electrolyte fuel cell.

The fuel cell membrane-catalyst electrode assembly produced thus is used by being fitted into a solid electrolyte fuel cell having a basic structure shown in FIG. 1.

The polymer electrolyte fuel cell produced using the membrane of the present invention has generally a basic structure of FIG. 1. The membrane of the present invention can also be used in a direct liquid fuel cell having other known structure.

As the liquid fuel, methanol is most popular and, when methanol is used, the effect of the present invention regarding the strong bonding is exhibited most strikingly. As other liquid fuels, there are ethanol, ethylene glycol, dimethyl ether, hydrazine, etc. With these fuels as well, the same excellent effect as in methanol use is exhibited. The fuel is not limited to liquid fuels and gaseous fuels such as hydrogen and the like can also be used.

EXAMPLES

The present invention is described more specifically below by way of Examples and Comparative Examples. However, the present invention is in no way restricted to these Examples. Incidentally, the properties of membranes for fuel cell and membrane-catalyst electrode assemblies for fuel cell, shown in the Examples and the Comparative Examples are the values obtained by the following methods.

1) Ion Exchange Capacity

A membrane for fuel cell was immersed in a 1 mol/l aqueous HCl solution for at least 10 hours.

Then, the membrane for fuel cell was immersed in a 1 mol/l aqueous NaCl solution and the counter ion of the ion exchange group of the membrane was changed from hydrogen ion to sodium ion.

The amount of hydrogen ion liberated was quantitatively determined using an aqueous sodium hydroxide solution, using a potentiometric titration apparatus (COMTITE-900, a product of Hiranuma Sangyo K.K.) (A mol).

Next, the same membrane was immersed in a 1 mol/l aqueous HCl solution for at least 4 hours. Then, the membrane was sufficiently washed with deionized water. The deionized water remaining on the membrane was removed and then the wet weight (Wg) of the membrane was measured. Then, the membrane was dried at 60° C. for 5 hours under reduced pressure and measured for dry weight (Dg).

Based on these measurement data, the ion exchange capacity and water content of the membrane for fuel cell were calculated using the following formulas.

Ion exchange capacity=$A \times 1000/D$ [mmol/g (dried weight)]

Water content=$100 \times (W-D)/D$ (%)

2) Membrane Resistance

A membrane for fuel cell was placed in the center of a two-chambers cell provided with platinum black electrodes and the two-chambers cell was divided at the center. A 3 mol/l aqueous sulfuric acid solution was filled in the spaces divided by the membrane. The resistance at 25° C. between the two electrodes was measured using an AC bridge (frequency: 1,000 cycles/sec) circuit. Then, the fuel cell membrane was removed and the resistance between the electrodes was measured in the same manner as above. The difference between the electrode-to-electrode resistance when the membrane was provided and the electrode-to-electrode resistance when the membrane was removed, was calculated and it was taken as membrane resistance. The membrane used in the above measurement had been beforehand equilibrated by immersing it in a 3 mol/l aqueous sulfuric acid solution.

3) Thickness of Adhesive Layer

The thickness of a membrane for fuel cell was measured using a micrometer having a terminal system of 5 mmφ. Separately, for the hydrocarbon cation exchange resin used in production of the fuel cell membrane, the thickness had been measured before formation of an adhesive layer on the hydrocarbon cation exchange resin. The thickness of the hydrocarbon cation exchange resin before formation of the adhesive layer was subtracted from the thickness of the fuel cell membrane, and the value obtained was taken as the thickness of the adhesive layer. Incidentally, with respect to the thickness of the fuel cell membrane and the thickness of the hydrocarbon cation exchange resin before formation of the adhesive layer, these thickness were each measured at 10 locations having 1 cm intervals and each average thereof was employed.

Incidentally, the thickness of the adhesive layer could also be measured by observing the section of the fuel cell membrane using a scanning type electron microscope (SEM).

4) Young's Modulus of Soft Cation Exchange Resin for Adhesive Layer

A solution of a soft cation exchange resin for adhesive layer was casted on a polytetrafluoroethylene, followed by drying, to produce a cast film of a soft cation exchange resin for adhesive layer. The cast film was placed in an atmosphere of 25° C. and 60% RH for 24 hours, for humidity adjustment; then, the cast film was subjected to a tensile test in the same atmosphere using a tensile tester (EZ Tester produced by Shimadzu Corporation), to obtain a curve showing the stress-strain relation of the cast film. From the inclination of the first linear portion of the curve was determined the Young's modulus of the soft cation exchange resin for adhesive layer.

5) Total Adhesion Amount of Intermediate Layer to the Surface of Cation Exchange Resin Membrane (Solvent Immersion Method)

There was prepared 40 ml of an equal-mass mixed solution of methanol and a 0.5 mol/l aqueous sodium hydroxide solution. In this solution was immersed a hydrocarbon cation exchange resin membrane (8 cm×8 cm) having an intermediate layer (an anion exchange resin) adhered thereto, at room temperature for 16 hours, to dissolve the anion exchange resin. Then, the resulting solution was analyzed by liquid chromatography. The amount of the anion exchange resin dissolved was determined using a calibration curve obtained by using a poly-4-vinylpyridine (weight-average molecular weight: 160,000) or a polyethyleneimine (weight-average molecular weight: 70,000). This resin amount was divided by the area (128 cm$^2$) of the two sides of the cation exchange resin membrane to calculate the adhesion amount per unit area (cm$^2$) of one side of the cation exchange resin membrane. The adhesion amount was taken as total adhesion amount of intermediate layer resin.

6) Adhesion Amount of Intermediate Layer Resin to the Surface of Cation Exchange Resin Membrane ATR Method (Used when the Adhesion Amount was 0.001 mg/cm$^2$ or More)

On each side of a germanium optical crystal (20 mm×50 mm×3 mm) was placed a cation exchange resin membrane (10 mm×45 mm) having an intermediate layer (an anion exchange resin) adhered thereto, to prepare a sample for measurement. Total reflection absorption spectroscopy was conducted in an atmosphere of 25° C. and 50% RH to measure the multiple reflection infrared spectrum of the sample at an incident angle of 45°. In the measurement, an infrared spectrometer (Spectrum One, a product of Perkin Elmer) was used.

Meanwhile, a given amount of a poly(4-vinylpyridine) (weight-average molecular weight: 160,000) or a polyethyleneimine (weight-average molecular weight: 70,000) was coated on a polyethylene terephthalate film, to prepare a standard sample. Using this standard sample, its multiple reflection infrared spectrum was measured. The absorption intensity based on the characteristic absorption of pyridine group (1,640 cm$^{-1}$) or imine group (1,641 cm$^{-1}$) was measured and, using these data, a calculation curve was prepared. Using this calibration curve, there was determined the adhesion amount per unit area (cm$^2$) of the intermediate layer resin at the surface of the cation exchange resin membrane.

Application Method of Solvent Immersion Method (Used when the Adhesion Amount was Less than 0.001 mg/cm$^2$)

First, the solvent immersion method explained in the above 3) was carried out to determine the total adhesion amount of an intermediate layer resin.

Then, the same cation exchange resin membrane having an intermediate layer adhered thereto, as described above was cut into an appropriate size. An alumina oxide powder was sprayed on the side of the cut-out cation exchange resin membrane, having an intermediate layer adhered thereto, to scrape off the surface portion of the cation exchange resin membrane in a 1-μm thickness (including the intermediate layer). The alumina oxide powder used contained no coarse particles and had an average particle diameter of about 30 μm. The spraying of the alumina oxide powder was conducted from a height of 100 mm from the membrane surface, at a pressure of 0.2 MPa for 30 seconds.

Then, using the membrane from which the surface layer had been scraped off, the solvent immersion method was conducted again and the amount of the anion exchange resin was determined. This amount indicates the substantial amount of the intermediate layer resin which had been infiltrated into the surface layer-scraped cation exchange resin membrane. By subtracting the total adhesion amount after scraping-off of surface layer, from the total adhesion amount before scraping-off of surface layer, the adhesion amount of the intermediate layer resin to the surface of the membrane was calculated.

Incidentally, using the hydrocarbon cation exchange resin membranes produced in Examples 11 and 13 both described later, there was compared the amount of the intermediate layer resin adhered to the surface of the cation exchange resin membrane, determined by the application method of solvent immersion method, with the adhesion amount of the above intermediate layer resin determined by the ATR method. The adhesion amounts determined by the former method were 0.0020 mg/cm$^2$ in Example 11 and 0.0025 mg/cm$^2$ in Example 13. Meanwhile, the adhesion amounts in these Examples, determined by the ATR method were completely the same as the above adhesion amounts as indicated in Table 6 and Table 7 both described later. From this result, it was confirmed that the adhesion amounts of intermediate layer resin to electrolyte membrane surface, determined by these two methods were substantially the same.

7) Bonding Property

A fuel cell membrane right after production and a membrane-catalyst electrode assembly for fuel cell, right after production were subjected to a tape peeling test in accordance with the X-cut tape peeling test of JIS K 5400. After peeling of the tape, the condition of the adhesive layer or the electrode layer remaining on the cation exchange resin membrane was observed visually and rated according to a 10-point method. This was taken as bonding property right after production.

Also, as described later, a test for output voltage was conducted for a hydrogen fuel cell or a direct methanol fuel cell. Further, a test for durability rating was conducted for the fuel cell, in order to confirm the power generation stability in long-term power generation. Then, the membrane-catalyst electrode assembly for fuel cell was taken out from the fuel cell; and the assembly was subjected to the same tape peeling test as above to rate its bonding property.

8) Output Voltage of Hydrogen Fuel Cell

A membrane-catalyst electrode assembly for fuel cell was interposed between two same carbon papers having a thickness of 200 μm and a porosity of 80%, and they were made into a fuel cell having a structure shown in FIG. 1. Then, the temperature of the fuel cell was set at 30° C. Hydrogen and air both of 30° C. and at atmospheric pressure and both humidified were fed into a fuel chamber and an oxidant chamber, respectively, at flow rates of 200 ml/min and 500 ml/min, respectively, to conduct a power generation test. Terminal voltages of the fuel cell at current densities of 0 A/cm$^2$ and 0.2 A/cm$^2$ were measured.

9) Output Voltage of Direct Methanol Fuel Cell

A membrane-catalyst electrode assembly for fuel cell was interposed between two same carbon papers having a thickness of 200 μm and a porosity of 80%, and they were made into a fuel cell having a structure shown in FIG. 1. Then, the temperature of the fuel cell was set at 30° C. Into the fuel chamber of the cell was fed a 20 mass % aqueous methanol solution at a flow rate of 1 ml/min. To the oxidant chamber of the cell was fed oxygen of atmospheric pressure at a flow rate of 200 ml/min. A power generation test was conducted, and terminal voltages of the cell at current densities of 0 A/cm$^2$ and 0.1 A/cm$^2$ were measured.

10) Rating of Durability

After the above measurement of the output voltage of each fuel cell, a continuous power generation test was conducted at 25° C. and 0.2 A/cm$^2$ in the case of the hydrogen fuel cell and at 25° C. and 0.1 A/cm$^2$ in the case of the direct methanol fuel cell. The output voltage after 250 hours was measured. With this measurement value, the durability of power generation of the membrane-catalyst electrode assembly for fuel cell was rated.

Production Example 1

There was prepared a monomers composition consisting of 100 parts by mass of styrene, 10 parts by mass (8.0 mol % in the total polymerizable monomers) of divinylbenzene and 5 parts by mass of tert-butyl peroxyethylhexanoate. In this monomers composition was immersed a porous membrane (thickness: 25 μm, porosity: 37%, average pore diameter: 0.03 μm) made of a polyethylene (PE, weight-average molecular weight: 250,000) at atmospheric pressure at 25° C. for 10 minutes, to infiltrate the monomers composition into the porous membrane.

Successively, the immersed porous membrane was taken out from the monomers composition and covered at the two sides with a polyester film (functioning as a peeling material) of 100 μm. Then, thermal polymerization was conducted in a nitrogen atmosphere of 0.3 MPa at 80° C. for 5 hours.

The filmy material obtained was immersed, at 40° C. for 45 minutes, in a 1:1 mixture of 98% sulfuric acid and chlorosulfuric acid having a purity of 90% or more, to obtain a sulfonic acid type cation exchange resin membrane. This cation exchange resin membrane was measured for ion exchange capacity, water content, membrane resistance and membrane thickness. The results thereof are shown in Table 3.

Production Examples 2 to 4

Cation exchange resin membranes were obtained in the same manner as in Production Example 1 except that the formulation of the monomers composition of Production Example 1 were changed to those shown in Table 1. These cation exchange resin membranes were measured for ion exchange capacity, water content, membrane resistance and membrane thickness. The results thereof are shown in Table 3.

TABLE 1

| Production Example | Substrate membrane | Formulation (mass parts) | | | | DVB ratio (relative to mono-functional monomers, mol %) |
| --- | --- | --- | --- | --- | --- | --- |
| | | St | 4VP | DVB | PO | |
| 1 | A | 100 | 0 | 10 | 5 | 8.0 |
| 2 | A | 100 | 0 | 20 | 5 | 16.0 |
| 3 | A | 55 | 45 | 15 | 5 | 12.1 |
| 4 | B | 100 | 0 | 10 | 5 | 8.0 |

Substrate membranes
A: Porous film made of a polyethylene having a weight-average molecular weight of 250,000, film thickness: 25 μm, average pore diameter: 0.03 μm, porosity: 37%
B: Porous film made of a polyethylene having a weight-average molecular weight of 200,000, film thickness: 16 μm, average pore diameter: 0.03 μm, porosity: 41%
St: Styrene
4VP: 4-Vinylpyridine
DVB: Divinylbenzene
PO: tert-Butyl peroxyethylhexanoate Production Example 5

The cation exchange resin membrane of Production Example 4 was dried at room temperature for 24 hours and then immersed in a liquid monomers composition shown in Table 2, containing a polymerizable monomer having an anion exchange group, at room temperature for 30 minutes.

Successively, the cation exchange resin membrane was taken out from the monomers composition and covered at the two side with a polyester film (functioning as a peeling material) of 100 μm. Then, thermal polymerization was conducted in a nitrogen atmosphere of 3 kg/cm$^2$ at 80° C. for 5 hours. The polymer obtained was immersed in methanol for 2 hours. Then, the polymer was immersed in a 1:1 (mass) mixed solution of methanol and a 0.5 mol/l aqueous sodium hydroxide solution, to obtain a sulfonic acid type cation exchange resin membrane. This cation exchange resin membrane had therein a cation exchange group and an anion exchange group, wherein the amount of the cation exchange group was larger than the amount of the anion exchange group. Since the cation exchange capacity of the membrane was smaller than the cation exchange capacity anticipated from the raw material monomers, it was confirmed that the anion exchange group in the membrane formed an ionic complex with the cation exchange group.

The cation exchange membrane obtained was measured for ion exchange capacity, water content, membrane resistance and membrane thickness. The results thereof are shown in Table 3.

TABLE 2

| Production Example | Ion exchange membrane | Formulation (mass parts) | | | | | DVB ratio (relative to monofunctional monomers, mol %) |
| --- | --- | --- | --- | --- | --- | --- | --- |
| | | 4VP | DVB | PO | Toluene | Pyridine | |
| 5 | Production Example 4 | 100 | 3 | 5 | 1000 | 100 | 2.4 |

4VP: 4-Vinylpyridine
DVB: Divinylbenzene
PO: tert-Butyl peroxyethylhexanoate

TABLE 3

| Production Example | Ion exchange capacity (mmol/g-dried membrane) | Water content (%) | Membrane resistance (Ω · cm$^2$) | Membrane thickness (μm) |
| --- | --- | --- | --- | --- |
| 1 | 2.4 | 30 | 0.08 | 28 |
| 2 | 1.6 | 17 | 0.17 | 27 |
| 3 | 0.9 | 22 | 0.19 | 28 |
| 4 | 2.5 | 35 | 0.05 | 27 |
| 5 | 1.4 | 21 | 0.15 | 22 |

Examples 1 to 4

On the both sides of the cation exchange resin membrane (proton type) of Production Example 1 was coated a tetrahydrofuran/1-propanol solution containing 2 mass % of a sulfonated polystyrene-poly(ethylene-butylene)-polystyrene tri-block copolymer, using screen printing. Then, the coated membrane was dried at 25° C. at atmospheric pressure for 2 hours to obtain cation exchange resin membranes having an adhesive layer on each side, as fuel cell membranes of the present invention. The obtained fuel cell membranes were measured for cation exchange capacity, water content, membrane resistance, membrane thickness and adhesive layer thickness. The results are shown in Table 5 and Table 6.

Incidentally, the properties of the resins used in the adhesive layers are shown in Table 4.

TABLE 4

| Adhesive layer resin | Weight-average molecular weight | Young's modulus (MPa) | Solubility in water (mass %) | Solubility in methanol (mass %) | Ion exchange capacity (mmol/g-dried membrane) |
|---|---|---|---|---|---|
| S-SEBS | 30,000 | 50 | 0.03 | 0.05 | 1.5 |
| S-SEPS | 50,000 | 70 | 0.05 | 0.07 | 1.5 |
| S-SEB | 30,000 | 50 | 0.04 | 0.05 | 1.5 |
| S-ranSEB | 150,000 | 80 | 0.05 | 0.05 | 1.5 |
| S-PEEK (1) | 20,000 | 200 | 0.07 | 0.10 | 1.2 |
| S-PEEK (2) | 50,000 | 500 | 0.05 | 0.08 | 0.8 |

S-SEBS: Sulfonated polystyrene-poly(ethylene-butylene)-polystyrene tri-block copolymer (styrene content: 30%)
S-SEPS: Sulfonated polystyrene-poly(ethylene-propylene)-polystyrene tri-block copolymer (styrene content: 30%)
S-SEB: Sulfonated polystyrene-poly(ethylene-butylene) di-block copolymer (styrene content: 30%)
S-ranSEB: Sulfonated poly(styrene-ethylene-butylene) random copolymer (styrene content: 30%)
S-PEEK: Sulfonated polyetheretherketone

TABLE 5

| Example | Cation exchange membrane | Kind of adhesive layer resin | Young's modulus of adhesive layer resin (MPa) | Kind of intermediate layer resin | Weight-average molecular weight of intermediate layer resin | Concentration of intermediate layer resin solution (wt. %) |
|---|---|---|---|---|---|---|
| 1 | Prod. Example 1 | S-SEBS | 50 | Not used | — | — |
| 2 | Prod. Example 1 | S-SEBS | 50 | Not used | — | — |
| 3 | Prod. Example 1 | S-SEBS | 50 | Not used | — | — |
| 4 | Prod. Example 1 | S-SEBS | 50 | Not used | — | — |
| 5 | Prod. Example 1 | S-SEPS | 70 | Not used | — | — |
| 6 | Prod. Example 1 | S-SEB | 50 | Not used | — | — |
| 7 | Prod. Example 1 | S-ranSEB | 80 | Not used | — | — |
| 8 | Prod. Example 2 | S-SEBS | 50 | Not used | — | — |
| 9 | Prod. Example 3 | S-SEBS | 50 | Not used | — | — |
| 10 | Prod. Example 5 | S-SEBS | 50 | Not used | — | — |
| 11 | Prod. Example 1 | S-SEBS | 50 | P4VP | 160,000 | 0.2 |
| 12 | Prod. Example 1 | S-SEBS | 50 | P4VP | 160,000 | 0.03 |
| 13 | Prod. Example 1 | S-SEBS | 50 | P4VP | 50,000 | 0.2 |
| 14 | Prod. Example 1 | S-PEEK (1) | 200 | P4VP | 160,000 | 0.2 |
| 15 | Prod. Example 5 | S-SEBS | 50 | P4VP | 160,000 | 0.2 |
| 16 | Prod. Example 1 | S-SEBS | 50 | PEI | 70,000 | 0.3 |
| Comp. Ex. 1 | Prod. Example 1 | Not used | — | Not used | — | — |
| Comp. Ex. 2 | Prod. Example 5 | Not used | — | Not used | — | — |
| Comp. Ex. 3 | Prod. Example 1 | Not used | — | P4VP | 160,000 | 0.2 |
| Comp. Ex. 4 | Prod. Example 1 | S-PEEK (2) | 500 | Not used | — | — |
| Comp. Ex. 5 | Prod. Example 1 | Commercial product A | 150 | Not used | — | — |

S-SEBS: Sulfonated polystyrene-poly(ethylene-butylene)-polystyrene tri-block copolymer (styrene content: 30%)
S-SEPS: Sulfonated polystyrene-poly(ethylene-propylene)-polystyrene tri-block copolymer (styrene content: 30%)
S-SEB: Sulfonated polystyrene-poly(ethylene-butylene) di-block copolymer (styrene content: 30%)
S-ranSEB: Sulfonated poly(styrene-ethylene-butylene) random copolymer (styrene content: 30%)
S-PEEK: Sulfonated polyetheretherketone
Commercial product A: Perfluorocarbonsulfonic acid
P4VP: Poly-4-vinylpyridine
PEI: Polyethyleneimine

TABLE 6

| Example | Cation exchange capacity (mmol/g-dried membrane) | Water content (%) | Membrane resistance ($\Omega \cdot cm^2$) | Membrane thickness ($\mu m$) | Adhesive layer thickness ($\mu m$-one side) | Adhesion amount of intermediate layer (mg/cm$^2$) Surface | Total amount |
|---|---|---|---|---|---|---|---|
| 1 | 2.4 | 30 | 0.08 | 29 | 0.5 | — | — |
| 2 | 2.4 | 30 | 0.08 | 32 | 2 | — | — |
| 3 | 2.4 | 31 | 0.08 | 38 | 5 | — | — |
| 4 | 2.4 | 33 | 0.09 | 57 | 15 | — | — |
| 5 | 2.4 | 30 | 0.08 | 32 | 2 | — | — |
| 6 | 2.4 | 30 | 0.08 | 32 | 2 | — | — |
| 7 | 2.4 | 35 | 0.08 | 32 | 2 | — | — |
| 8 | 1.6 | 17 | 0.17 | 32 | 2 | — | — |
| 9 | 0.9 | 22 | 0.19 | 32 | 2 | — | — |
| 10 | 1.4 | 22 | 0.16 | 26 | 2 | — | — |

TABLE 6-continued

| | | | | | | | |
|---|---|---|---|---|---|---|---|
| 11 | 2.4 | 30 | 0.08 | 32 | 2 | 0.0020 | 0.0020 |
| 12 | 2.4 | 30 | 0.08 | 32 | 2 | 0.0004* | 0.0004* |
| 13 | 2.4 | 30 | 0.08 | 32 | 2 | 0.0025 | 0.0025 |
| 14 | 2.4 | 30 | 0.10 | 32 | 2 | 0.0020 | 0.0020 |
| 15 | 1.4 | 22 | 0.16 | 26 | 2 | 0.0020 | 0.0020 |
| 16 | 2.4 | 30 | 0.08 | 32 | 2 | 0.0022 | 0.0022 |
| Comp. Ex 1 | 2.4 | 30 | 0.08 | 28 | — | — | — |
| Comp. Ex 2 | 1.4 | 21 | 0.15 | 22 | — | — | — |
| Comp. Ex 3 | 2.4 | 30 | 0.08 | 28 | — | 0.0020 | 0.0020 |
| Comp. Ex 4 | 2.4 | 30 | 0.08 | 30 | 2 | — | — |
| Comp. Ex 5 | 2.4 | 30 | 0.08 | 30 | 2 | — | — |

| Example | Bonding property (point) | | Output voltage of hydrogen fuel cell (V) | | Durability rating (after 250-hr power generation) (V) |
|---|---|---|---|---|---|
| | Right after production | After 250-hr power generation | 0 A/cm² | 0.2 A/cm² | 0.2 A/cm² |
| 1 | 8 | 7 | 0.94 | 0.58 | 0.48 |
| 2 | 9 | 8 | 0.96 | 0.58 | 0.52 |
| 3 | 9 | 8 | 0.96 | 0.56 | 0.50 |
| 4 | 9 | 7 | 0.95 | 0.48 | 0.43 |
| 5 | 8 | 7 | 0.96 | 0.55 | 0.48 |
| 6 | 8 | 7 | 0.96 | 0.52 | 0.46 |
| 7 | 8 | 7 | 0.94 | 0.53 | 0.44 |
| 8 | 8 | 7 | 1.05 | 0.38 | 0.35 |
| 9 | 8 | 7 | 1.02 | 0.33 | 0.29 |
| 10 | 8 | 7 | 1.01 | 0.33 | 0.29 |
| 11 | 10 | 10 | 1.00 | 0.63 | 0.63 |
| 12 | 10 | 10 | 0.96 | 0.61 | 0.60 |
| 13 | 10 | 10 | 0.98 | 0.58 | 0.57 |
| 14 | 10 | 9 | 0.93 | 0.45 | 0.38 |
| 15 | 10 | 10 | 1.01 | 0.40 | 0.39 |
| 16 | 10 | 10 | 0.92 | 0.58 | 0.57 |
| Comp. Ex 1 | 0 | 0 | 0.93 | 0.25 | 0.12 |
| Comp. Ex 2 | 0 | 0 | 1.02 | 0.20 | 0.10 |
| Comp. Ex 3 | 10 | 10 | 1.00 | 0.55 | 0.53 |
| Comp. Ex 4 | 8 | 0 | 0.95 | 0.23 | 0.11 |
| Comp. Ex 5 | 6 | 0 | 0.95 | 0.25 | 0.12 |

*Measured by the application method of solvent immersion method (All data other than those having a * mark obtained by the ATR method)

Separately, a carbon black having 50 mass % of platinum loaded thereon was mixed with a solution [Nafion (trade name) produced by Du Pont] obtained by dissolving 5% of perfluorocarbonsulfonic acid in a mixed solvent (alcohol+water), to prepare a catalyst dispersion. The catalyst dispersion was coated on a polytetrafluoroethylene sheet so that the catalyst became 0.5 mg/cm², followed by drying at 80° C. for 4 hours under reduced pressure, to prepare a catalyst electrode layer on the polytetraethylene sheet.

Then, the polytetraethylene sheet having a catalyst electrode layer formed thereon was placed on both sides of the above-mentioned fuel cell membrane so that the catalyst electrode layer faced the both sides of the membrane. Hot pressing was conducted at 100° C. at a pressure of 5 MPa for 100 seconds to transfer the catalyst layer onto the both sides of the membrane, whereby a membrane-catalyst electrode assembly for fuel cell was obtained. This membrane-catalyst electrode assembly for fuel cell was evaluated for bonding property, output voltage of hydrogen fuel cell and durability. The results are shown in Table 6.

A membrane-catalyst electrode assembly was produced in the same manner as above except that a platinum catalyst was loaded in an amount of 3 mg/cm² in the catalyst electrode layer of oxidant chamber side and that the catalyst electrode layer of fuel chamber side was produced using a carbon black having 50 mass % of a platinum-ruthenium alloy catalyst (ruthenium: 50 mol %) loaded thereon and, in the catalyst electrode layer of fuel chamber side, the catalyst was loaded in an amount of 3 mg/cm².

The membrane-catalyst electrode assembly was evaluated for output voltage of direct methanol fuel cell and durability. The results are shown in Table 7.

TABLE 7

| Example | Cation exchange capacity (mmol/g-dried membrane) | Water content (%) | Membrane resistance (Ω·cm²) | Membrane thickness (μm) | Adhesive layer thickness (μm) | Adhesion amount of intermediate layer (mg/cm²) | |
|---|---|---|---|---|---|---|---|
| | | | | | | Surface | Total amount |
| 1 | 2.4 | 30 | 0.08 | 29 | 0.5 | — | — |
| 2 | 2.4 | 30 | 0.08 | 32 | 2 | — | — |
| 3 | 2.4 | 31 | 0.08 | 38 | 5 | — | — |
| 4 | 2.4 | 33 | 0.09 | 57 | 15 | — | — |
| 5 | 2.4 | 30 | 0.08 | 32 | 2 | — | — |

TABLE 7-continued

| Example | | | | | | | |
|---|---|---|---|---|---|---|---|
| 6 | 2.4 | 30 | 0.08 | 32 | 2 | — | — |
| 7 | 2.4 | 35 | 0.08 | 32 | 2 | — | — |
| 8 | 1.6 | 17 | 0.17 | 32 | 2 | — | — |
| 9 | 0.9 | 22 | 0.19 | 32 | 2 | — | — |
| 10 | 1.4 | 22 | 0.16 | 26 | 2 | — | — |
| 11 | 2.4 | 30 | 0.08 | 32 | 2 | 0.0020 | 0.0020 |
| 12 | 2.4 | 30 | 0.08 | 32 | 2 | 0.0004 * | 0.0004 * |
| 13 | 2.4 | 30 | 0.08 | 32 | 2 | 0.0025 | 0.0025 |
| 14 | 2.4 | 30 | 0.10 | 32 | 2 | 0.0020 | 0.0020 |
| 15 | 1.4 | 22 | 0.16 | 26 | 2 | 0.0020 | 0.0020 |
| 16 | 2.4 | 30 | 0.08 | 32 | 2 | 0.0022 | 0.0022 |
| Comp. Ex 1 | 2.4 | 30 | 0.08 | 28 | — | — | — |
| Comp. Ex 2 | 1.4 | 21 | 0.15 | 22 | — | — | — |
| Comp. Ex 3 | 2.4 | 30 | 0.08 | 28 | — | 0.0020 | 0.0020 |
| Comp. Ex 4 | 2.4 | 30 | 0.08 | 30 | 2 | — | — |
| Comp. Ex 5 | 2.4 | 30 | 0.08 | 30 | 2 | — | — |

| | Bonding property (point) | | Output voltage of methanol fuel cell (V) | | Durability rating (after 250-hr power generation) (V) |
|---|---|---|---|---|---|
| Example | Right after production | After 250-hr power generation | 0 A/cm$^2$ | 0.1 A/cm$^2$ | 0.1 A/cm$^2$ |
| 1 | 8 | 6 | 0.61 | 0.33 | 0.26 |
| 2 | 9 | 7 | 0.62 | 0.38 | 0.33 |
| 3 | 9 | 7 | 0.62 | 0.37 | 0.33 |
| 4 | 9 | 6 | 0.61 | 0.31 | 0.26 |
| 5 | 8 | 6 | 0.60 | 0.33 | 0.24 |
| 6 | 8 | 6 | 0.61 | 0.33 | 0.25 |
| 7 | 8 | 6 | 0.61 | 0.32 | 0.25 |
| 8 | 8 | 6 | 0.69 | 0.31 | 0.26 |
| 9 | 8 | 6 | 0.80 | 0.36 | 0.29 |
| 10 | 8 | 6 | 0.88 | 0.40 | 0.34 |
| 11 | 10 | 10 | 0.63 | 0.44 | 0.42 |
| 12 | 10 | 10 | 0.63 | 0.43 | 0.42 |
| 13 | 10 | 10 | 0.63 | 0.40 | 0.39 |
| 14 | 10 | 8 | 0.61 | 0.36 | 0.31 |
| 15 | 10 | 10 | 0.89 | 0.50 | 0.50 |
| 16 | 10 | 10 | 0.63 | 0.43 | 0.42 |
| Comp. Ex 1 | 0 | 0 | 0.58 | 0.23 | 0.10 |
| Comp. Ex 2 | 0 | 0 | 0.63 | 0.15 | 0.04 |
| Comp. Ex 3 | 10 | 10 | 0.62 | 0.34 | 0.33 |
| Comp. Ex 4 | 8 | 0 | 0.57 | 0.20 | 0.10 |
| Comp. Ex 5 | 6 | 0 | 0.57 | 0.18 | 0.08 |

*Measured by the application method of solvent immersion method (All data other than those having a * mark obtained by the ATR method)

Examples 5 to 10

Fuel cell membranes were obtained in the same manner as in Example 1 except that the ion exchange resin membranes and adhesive layer resins shown in Table 5 were used. These fuel cell membranes were measured for cation exchange capacity, water content, membrane resistance, membrane thickness and adhesive layer thickness. The results are shown in Table 6.

Then, using these fuel cell membranes, membrane-catalyst electrode assemblies for fuel cell were produced in the same operation as in Example 1. The membrane-catalyst electrode assemblies for fuel cell were evaluated for bonding property, output voltage of hydrogen fuel cell, and durability. The results are shown in Table 6.

The membrane-catalyst electrode assemblies for fuel cell were evaluated for bonding property, output voltage of direct methanol fuel cell, and durability. The results are shown in Table 7.

Example 11

The cation exchange membrane produced in Production Example 1 was immersed in a methanol solution containing 0.2 mass % of a poly-4-vinylpyridine (weight-average molecular weight: 160,000) at room temperature for 15 minutes, followed by drying at 25° C. for 16 hours at atmospheric pressure. The membrane was further dried at 40° C. for 5 hours under reduced pressure. Then, the dried membrane was immersed in methanol at room temperature for 30 minutes. Thereafter, fresh methanol was used and the immersion was conducted similarly two times in total. Next, the membrane was dried at room temperature for 5 hours to obtain a fuel cell membrane having an intermediate layer. An adhesive layer was formed on the intermediate layers on the fuel cell membrane, in the same manner as in Example 1, to obtain a fuel cell membrane having intermediate layers thereon, of the present invention. The fuel cell membrane was measured for cation exchange capacity, water content, membrane resistance, membrane thickness, and the adhesion amount of opposite polarity polymer, and the results are shown in Table 6 and Table 7.

Then, the same operation as in Example 1 was conducted to obtain a membrane-catalyst electrode assembly for fuel cell. The membrane-catalyst electrode assembly for fuel cell was evaluated for bonding property, output voltage of hydrogen fuel cell and durability. The results are shown in Table 6.

The membrane-catalyst electrode assembly for fuel cell was evaluated for output voltage of direct methanol fuel cell and durability. The results are shown in Table 7.

Examples 12 to 15

Fuel cell membranes were obtained in the same manner as in Example 10 except that the concentrations of intermediate layer resin solution, the kinds of intermediate layer resin, and the thicknesses of adhesive layer, all shown in Table 5 were used. These fuel cell membranes were measured for cation exchange capacity, water content, membrane resistance, membrane thickness, and thickness of adhesive layer and the results are shown in Table 6 and Table 7.

Then, using these fuel cell membranes, membrane-catalyst electrode assemblies for fuel cell were produced in the same operation as in Example 1. The membrane-catalyst electrode assemblies for fuel cell were evaluated for bonding property, output voltage of hydrogen fuel cell and durability. The results are shown in Table 6.

The membrane-catalyst electrode assemblies for fuel cell were evaluated for output voltage of direct methanol fuel cell and durability. The results are shown in Table 7.

Example 16

A fuel cell membrane was obtained in the same manner as in Example 11 except that the intermediate layer was formed using an aqueous polyethyleneimine solution and the membrane was washed with water. These fuel cell membranes were measured for cation exchange capacity, water content, membrane resistance, membrane thickness, and thickness of adhesive layer and the results are shown in Table 6 and Table 7.

Then, using these fuel cell membranes, membrane-catalyst electrode assemblies for fuel cell were produced in the same operation as in Example 1. The membrane-catalyst electrode assemblies for fuel cell were evaluated for bonding property, output voltage of hydrogen fuel cell and durability. The results are shown in Table 6.

The membrane-catalyst electrode assemblies for fuel cell were evaluated for output voltage of direct methanol fuel cell and durability. The results are shown in Table 7.

Comparative Examples 1 to 2

The cation exchange membrane of Production Example 1 before formation of adhesive layer was per se used as a fuel cell membrane. Membrane-catalyst electrode assemblies for fuel cell were produced in the same manner as in Example 1. The assemblies were evaluated for bonding property, output voltage of hydrogen fuel cell and durability. The results are shown in Table 6.

The membrane-catalyst electrode assemblies for fuel cell were evaluated for output voltage of direct methanol fuel cell and durability. The results are shown in Table 7.

Comparative Example 3

A fuel cell membrane was produced by forming only an intermediate layer on the cation exchange membrane produced in Production Example 1, using the same operation as in Example 11. The fuel cell membrane was measured for cation exchange capacity, water content, membrane resistance, membrane thickness, and the thickness of adhesive layer and the results are shown in Table 6 and Table 7.

Then, using the membrane, a membrane-catalyst electrode assembly for fuel cell was produced.

The membrane-catalyst electrode assembly for fuel cell was evaluated for bonding property, output voltage of hydrogen fuel cell and durability. The results are shown in Table 6.

The membrane-catalyst electrode assembly for fuel cell was evaluated for output voltage of direct methanol fuel cell and durability. The results are shown in Table 7.

Comparative Examples 4 to 5

Fuel cell membranes were obtained in the same manner as in Example 1 except that the adhesive layer resin used in Example 1 was changed to a sulfonated polyetheretherketone or perfluorocarbonsulfonic acid (commercial product A). These fuel cell membranes were measured for cation exchange capacity, water content, membrane resistance, membrane thickness and the thickness of adhesion layer. The results are shown in Table 6.

The same operation as in Example 1 was conducted to obtain membrane-catalyst electrode assemblies for fuel cell. The membrane-catalyst electrode assemblies for fuel cell were evaluated for bonding property, output voltage of hydrogen fuel cell and durability. The results are shown in Table 6.

The membrane-catalyst electrode assemblies for fuel cell were evaluated for output voltage of direct methanol fuel cell and durability. The results are shown in Table 7.

The invention claimed is:

1. A membrane for polymer electrolyte fuel cell used for preparing a membrane-electrode assembly, which comprises a hydrocarbon cation exchange resin membrane wherein a cation exchange group is covalently bonded to a hydrocarbon resin, and an adhesive layer used for bonding a catalyst electrode layer formed on at least one side of the hydrocarbon cation exchange resin membrane, wherein the adhesive layer consists essentially of a hydrocarbon cation exchange resin having a Young's modulus of 1 to 300 MPa and a solubility of less than 1% by mass in water of 20° C., wherein the thickness of the adhesive layer is 0.1 to 20 μm.

2. The membrane for polymer electrolyte fuel cell according to claim 1, wherein the adhesive layer has a solubility of less than 1% by mass in methanol of 20° C.

3. The membrane for polymer electrolyte fuel cell according to claim 1, wherein the adhesive layer is made of a styrene-based, soft cation exchange resin wherein a cation exchange group is covalently bonded to a styrene-based elastomer.

4. The membrane for polymer electrolyte fuel cell according to claim 3, wherein the styrene-based elastomer is a polystyrene-polyalkylene-polystyrene triblock copolymer.

5. The membrane for polymer electrolyte fuel cell according to claim 1, wherein an intermediate layer made of a hydrocarbon anion exchange resin is present between the hydrocarbon cation exchange resin membrane and the adhesive layer.

6. A membrane-electrode assembly which is obtained by forming a catalyst electrode layer on at least one side of the membrane for polymer electrolyte fuel cell according to claim 1.

7. The membrane-electrode assembly according to claim 6, wherein the catalyst electrode layer is formed on both sides of the membrane for polymer electrolyte fuel cell.

8. The membrane for polymer electrolyte fuel cell according to claim 1 wherein the adhesive layer comprises non-crosslinked hydrocarbon cation exchange resin.

* * * * *